(12) United States Patent
Howard

(10) Patent No.: US 10,958,051 B1
(45) Date of Patent: Mar. 23, 2021

(54) ELECTRICAL CONDUIT CONNECTOR

(71) Applicant: Anthony James Howard, Vaughan (CA)

(72) Inventor: Anthony James Howard, Vaughan (CA)

( * ) Notice: Subject to any disclaimer, the term of this patent is extended or adjusted under 35 U.S.C. 154(b) by 0 days.

(21) Appl. No.: 16/774,548

(22) Filed: Jan. 28, 2020

(51) Int. Cl.
*H02G 3/06* (2006.01)

(52) U.S. Cl.
CPC ......... *H02G 3/0683* (2013.01); *H02G 3/0666* (2013.01)

(58) Field of Classification Search
CPC ............................ H02G 3/0683; H02G 3/0666
USPC ........................................................ 174/665
See application file for complete search history.

(56) References Cited

U.S. PATENT DOCUMENTS

| | | | |
|---|---|---|---|
| 377,506 A * | 2/1888 | Whiter | F16L 41/001 285/209 |
| 1,049,283 A | 12/1912 | Westphal | |
| 1,355,450 A | 10/1920 | Carlson | |
| 1,659,094 A | 2/1928 | Godfrey | |
| 2,241,293 A * | 5/1941 | Campbell | H02G 3/0616 285/154.1 |
| 3,981,061 A | 9/1976 | Jackson et al. | |
| 5,894,109 A | 4/1999 | Marik | |
| 6,521,833 B1 | 2/2003 | De Freitas | |
| 7,078,623 B1 * | 7/2006 | Sheehan | H02G 3/0616 174/135 |
| 7,390,979 B1 | 6/2008 | Johnson | |
| 7,576,290 B1 | 8/2009 | Korcz | |
| 7,824,213 B1 | 11/2010 | Korcz et al. | |
| 7,841,639 B2 * | 11/2010 | Tanaka | B62D 47/003 296/65.05 |
| 8,129,634 B2 | 3/2012 | Sheehan et al. | |
| 8,857,039 B2 | 10/2014 | Sathyanarayana et al. | |
| 8,901,441 B2 | 12/2014 | Sathyanarayana et al. | |
| 9,231,388 B2 | 1/2016 | Chavan et al. | |
| 9,431,808 B1 | 8/2016 | Perkins | |
| 2004/0251682 A1 | 12/2004 | Pyron | |
| 2005/0035593 A1 * | 2/2005 | Auray | H02G 3/0675 285/154.1 |
| 2006/0237210 A1 * | 10/2006 | Cheng | H02G 3/0616 174/51 |
| 2010/0084854 A1 | 4/2010 | Sathyanarayana et al. | |
| 2015/0136473 A1 | 5/2015 | Jafari et al. | |

* cited by examiner

*Primary Examiner* — Timothy J Thompson
*Assistant Examiner* — Michael F McAllister
(74) *Attorney, Agent, or Firm* — Bereskin & Parr LLP/S.E.N.C.R.L., s.r.l.; Isis E. Caulder

(57) ABSTRACT

A connector for coupling a conduit to an electrical enclosure includes a body and a lock nut. The body extends longitudinally between a proximal enclosure end and a distal conduit end. The body has an enclosure port at the enclosure end, a conduit port at the conduit end, and an internal passage extending between the enclosure port and the conduit port. The enclosure end has radially opposed first and second retention tabs. The body has external body threads located distally of the retention tabs. Each of the retention tabs extend radially outward of a longitudinal projection of the external threads. The lock nut is mated with the external body threads. The lock nut has an enclosure engagement end opposed to distal facing enclosure engagement sides of the retention tabs. The lock nut is rotatable on the external body threads to advance the enclosure engagement end toward the retention tabs.

20 Claims, 16 Drawing Sheets

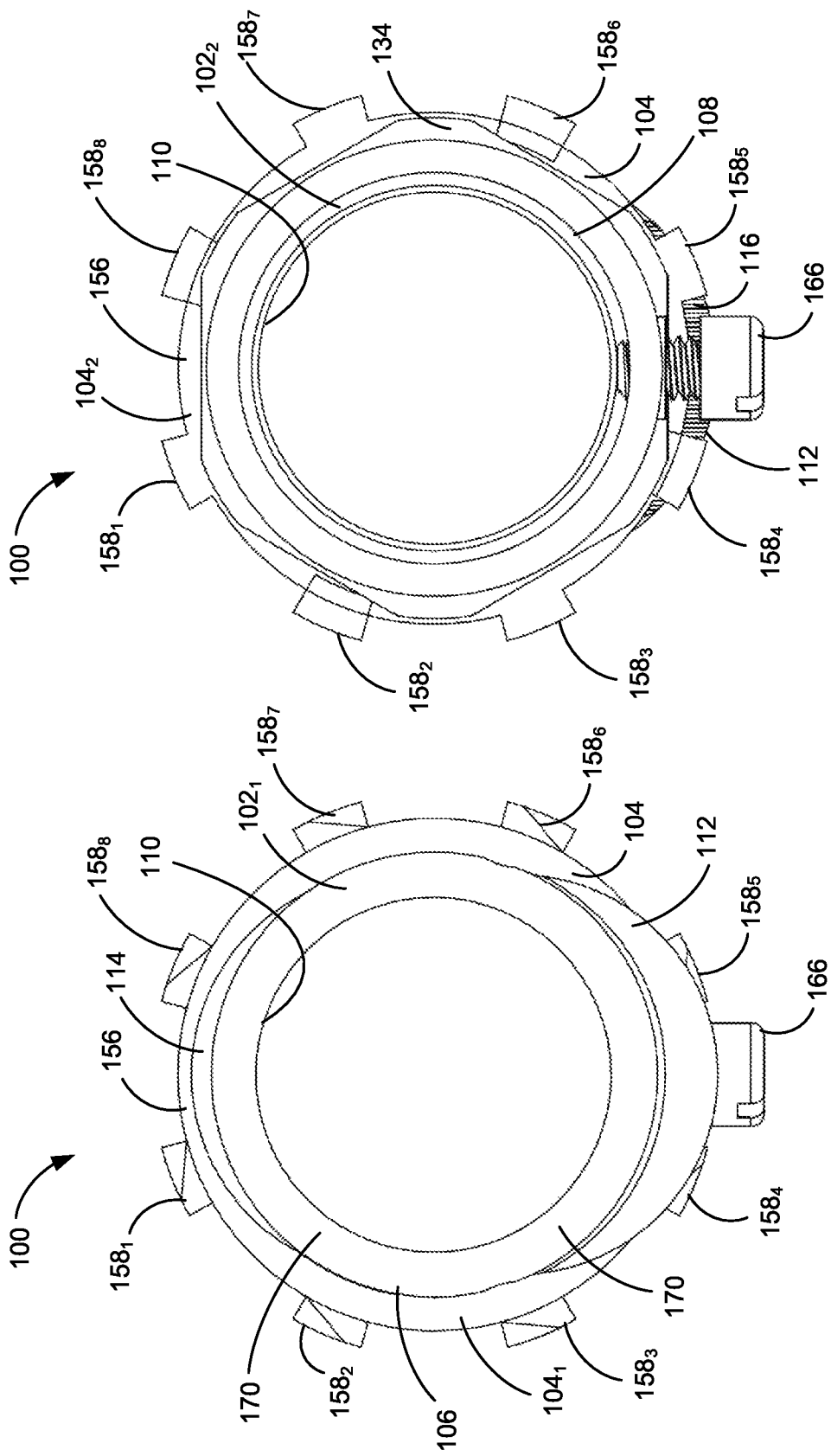

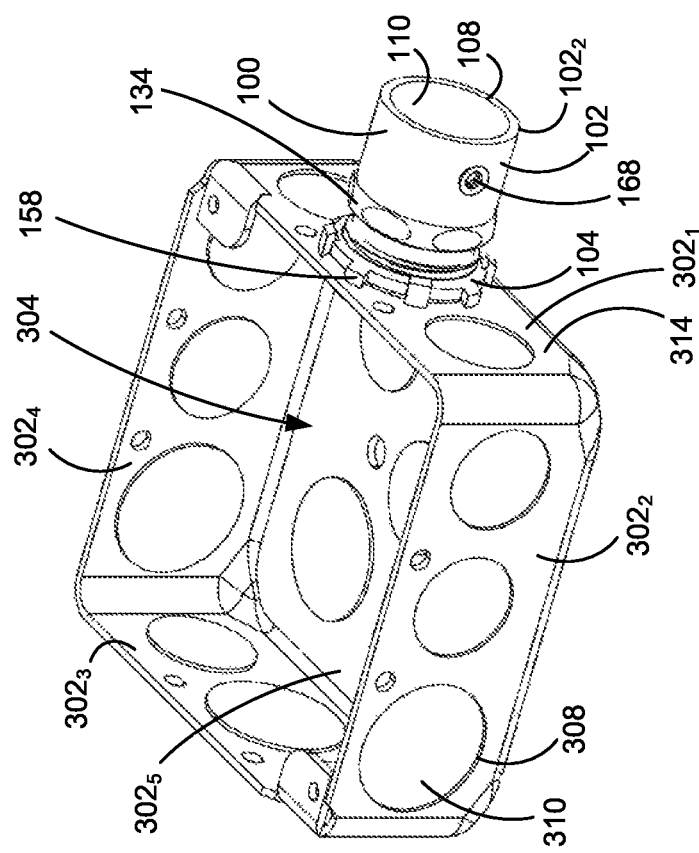
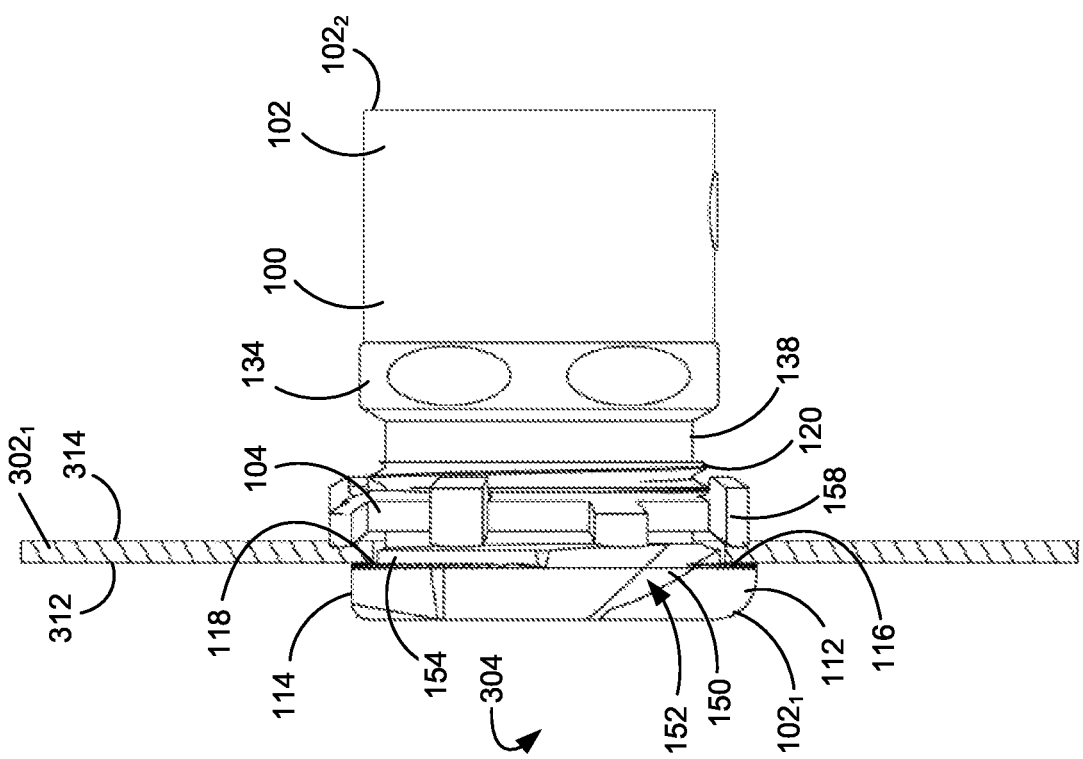

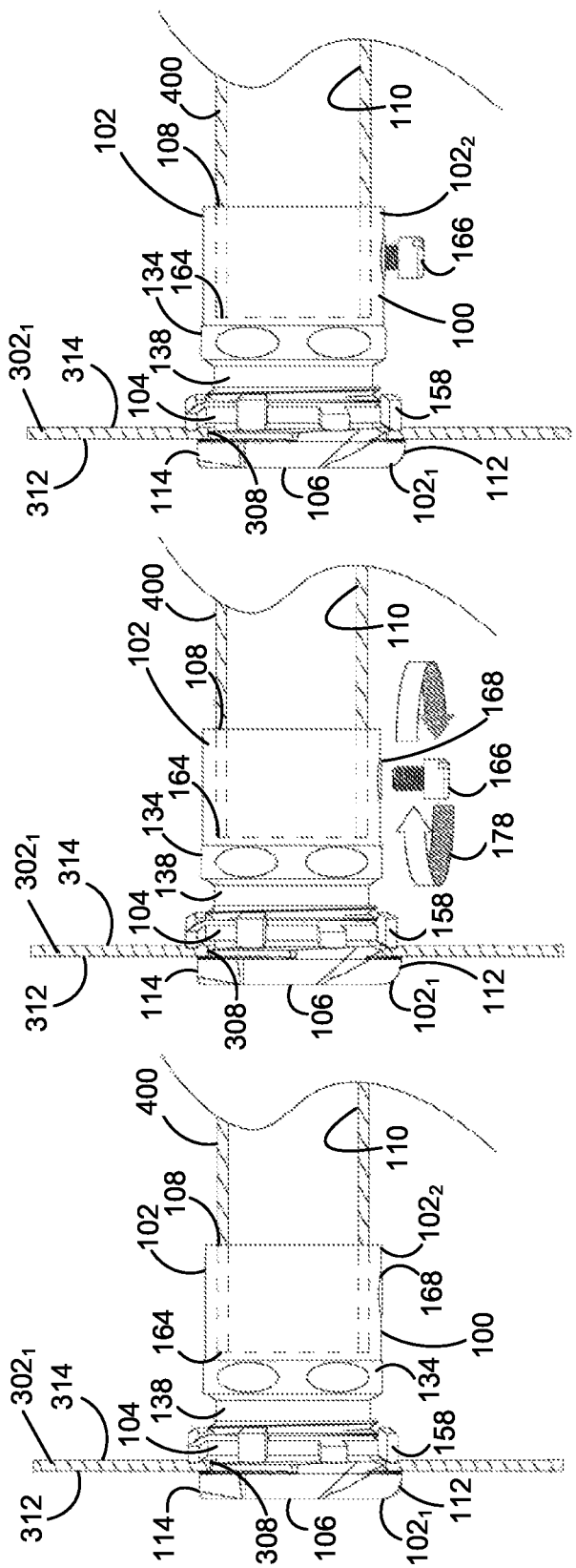

ELECTRICAL CONDUIT CONNECTOR

FIELD

This disclosure generally relates to a conduit connector that allows for quick, safe and rigid coupling of a conduit to an electrical enclosure.

BACKGROUND

Electrical conduit connectors are known. These conduit connectors are commonly used to facilitate the attachment of a conduit or cable to an electrical enclosure, such as a junction box, an outlet box, a circuit panel, etc. Known conduit connectors are typically integrated with an adapter end opposite to an end that is connectable to the electrical enclosure. The adapter end may permit attachment of a conduit, cable or the like to the conduit connector. One or more wires may be routed through the conduit and conduit connector into the electrical enclosure. Known conduit connectors can plague electricians with a significant amount of installation challenges, safety concerns, and cost and/or material inefficiencies.

SUMMARY

In a broad aspect, at least one embodiment described herein provides an electrical conduit connector for coupling a conduit to an electrical enclosure. The connector includes a connector body and a lock nut. The connector body extends longitudinally between a proximal electrical enclosure end and a distal conduit end. The connector body has an electrical enclosure port at the electrical enclosure end, a conduit port at the conduit end, and an internal passage extending between the electrical enclosure port and the conduit port. The electrical enclosure end has radially opposed first and second retention tabs. Each of the first and second retention tabs extend radially outwardly. Each of the first and second retention tabs have a distal facing enclosure engagement side. The connector body also has external body threads located distally of the first and second retention tabs. Each of the first and second retention tabs extend radially outward of a longitudinal projection of the external body threads. The lock nut is mated with the external body threads. The lock nut has an enclosure engagement end opposed to the enclosure engagement sides of the first and second retention tabs. The lock nut is rotatable on the external body threads to advance the enclosure engagement end toward the first and second retention tabs.

In at least one embodiment, the lock nut is trapped on the connector body.

In at least one embodiment, the internal passage defines a longitudinal centre line, the first retention tab has a first tab radial extent from the centre line, the second retention tab has a second tab radial extent from the centre line, the external body threads have a thread radial extent from the centre line, each of the first and second tab radial extents being greater than the thread radial extent.

In at least one embodiment, the first and second retention tabs obstruct removal of the lock nut from the electrical enclosure end.

In at least one embodiment, contact between i) the enclosure engagement sides of the first and second retention tabs and ii) the enclosure engagement end of the lock nut obstructs advancement of the lock nut toward the electrical enclosure end of the connector body.

In at least one embodiment, the connector body has a shoulder located distally of the external body threads, the shoulder having a shoulder radial extent from the longitudinal centre line that is greater than the thread radial extent.

In at least one embodiment, the connector body has an external surface located between the external body threads and the shoulder, the external surface having a longitudinal depth equal to or greater than that of the lock nut so that the lock nut can be formed around the external surface.

In at least one embodiment, the shoulder obstructs removal of the lock nut from the conduit end.

In at least one embodiment, the lock nut has a shoulder engagement end opposed to the enclosure engagement end, the shoulder has a proximal facing lock nut engagement side opposed to the shoulder engagement end of the lock nut, and contact between i) the lock nut engagement side of the shoulder and ii) the shoulder engagement end of the lock nut obstructs advancement of the lock nut toward the conduit end of the connector body.

In at least one embodiment, the lock nut has internal nut threads that mate with the external body threads.

In at least one embodiment, the first tab radial extent is greater than the second tab radial extent.

In at least one embodiment, the first retention tab has a first circumferential extent between 90 and 125 degrees.

In at least one embodiment, the first retention tab has a first circumferential extent of about 125 degrees.

In at least one embodiment, the electrical enclosure end of the connector body has an arcuate groove that extends from one side of the first circumferential extent at the electrical enclosure end, distally around the first retention tab, to the other side of the first circumferential extent at the electrical enclosure end, the arcuate groove defining a knockout insertion band.

In at least one embodiment, the second retention tab has a second circumferential extent between 90 and 105 degrees.

In at least one embodiment, the second retention tab has a second circumferential extent of about 105 degrees.

In at least one embodiment, the first and second retention tabs have a collective circumferential extent between 180 and 230 degrees.

In at least one embodiment, the first and second retention tabs have a collective circumferential extent of about 230 degrees.

In at least one embodiment, the lock nut comprises a lock nut body and a plurality of enclosure engagement teeth extending radially outwardly and proximally from the lock nut body.

In at least one embodiment, the conduit port is adapted to receive the conduit therein.

In at least one embodiment, the enclosure engagement side of at least one of the first and second retention tabs has enclosure-gripping features.

In at least one embodiment, the electrical enclosure end of the connector body has a stabilizing ring located immediately distal of the first and second retention tabs, the stabilizing ring having a knockout diameter.

In at least one embodiment, the internal passage is generally cylindrical.

In at least one embodiment, the internal passage has a fillet at the electrical enclosure port to smooth transition into and out of the internal passage, the fillet having a radius of curvature between 1 and 100 mm.

In another broad aspect, at least one embodiment described herein provides an electrical conduit connector for coupling a conduit to an electrical enclosure. The connector includes a connector body and a lock nut. The connector body extends longitudinally between a proximal electrical enclosure end and a distal conduit end. The connector body has an electrical enclosure port at the electrical enclosure end, a conduit port at the conduit end, and an internal passage extending between the electrical enclosure port and the conduit port. The electrical enclosure end has radially opposed first and second retention tabs. Each of the first and second retention tabs extend radially outwardly. Each of the first and second retention tabs have a distal facing enclosure engagement side. The first retention tab has a first circumferential extent between 90 and 125 degrees. The second retention tab has a second circumferential extent between 90 and 105 degrees. The connector body also has external body threads located distally of the first and second retention tabs. The lock nut is mated with the external body threads. The lock nut has an enclosure engagement end opposed to the enclosure engagement sides of the first and second retention tabs. The lock nut is rotatable on the external body threads to advance the enclosure engagement end toward the first and second retention tabs.

In another broad aspect, at least one embodiment described herein provides an electrical conduit connector for coupling a conduit to an electrical enclosure. The connector includes a connector body and a lock nut. The connector body extends longitudinally between a proximal electrical enclosure end and a distal conduit end. The connector body has an electrical enclosure port at the electrical enclosure end, a conduit port at the conduit end, and an internal passage extending between the electrical enclosure port and the conduit port. The internal passage has a fillet at the electrical enclosure port to smooth transition into and out of the internal passage. The fillet has a radius of curvature between 1 and 100 mm. The electrical enclosure end has radially opposed first and second retention tabs. Each of the first and second retention tabs extend radially outwardly. Each of the first and second retention tabs have a distal facing enclosure engagement side. The connector body also has external body threads located distally of the first and second retention tabs. The lock nut is mated with the external body threads. The lock nut has an enclosure engagement end opposed to the enclosure engagement sides of the first and second retention tabs. The lock nut is rotatable on the external body threads to advance the enclosure engagement end toward the first and second retention tabs.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 1C is a top view of the electrical conduit connector of FIG. 1A;

FIG. 1D is a bottom view of the electrical conduit connector of FIG. 1A;

FIG. 7 is a cutaway view illustrating the electrical conduit connector of FIGS. 1A-1E securely connected to the outlet box of FIG. 3;

FIG. 8 is a perspective view illustrating the electrical conduit connector of FIGS. 1A-1E securely connected to the outlet box of FIG. 3;

FIG. 10 is a cutaway view illustrating a first step in connecting a tubular conduit to the electrical conduit connector of FIGS. 1A-1E previously connected to the outlet box of FIG. 3;

FIG. 11 is a cutaway view illustrating a further step in connecting the tubular conduit to the electrical conduit connector of FIGS. 1A-1E previously connected to the outlet box of FIG. 3;

FIG. 12 is a cutaway view illustrating the tubular conduit coupled to the outlet box of FIG. 3 by the electrical conduit connector of FIGS. 1A-1E;

Figure 1A:
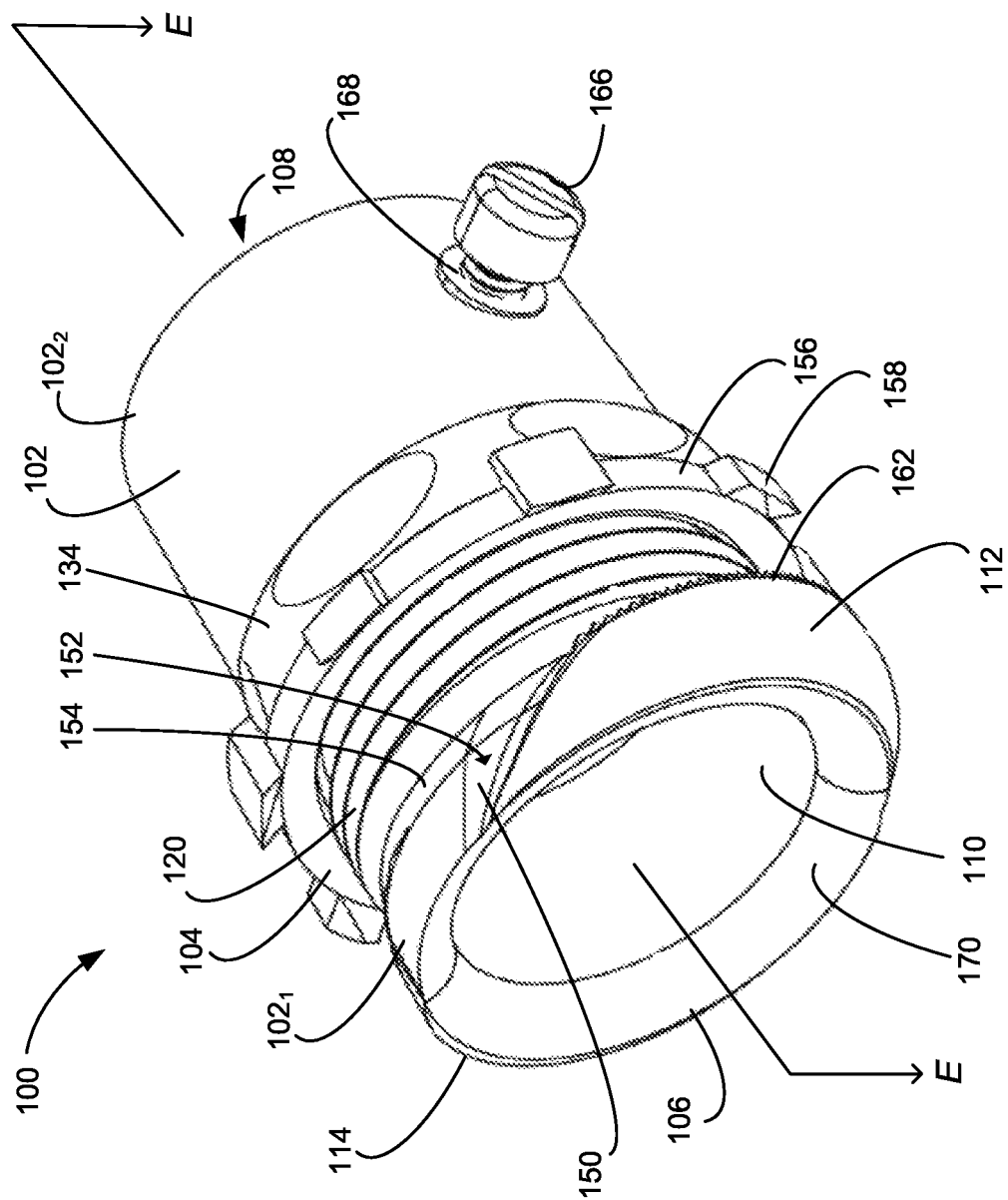
FIG. 1A is a perspective view of an electrical conduit connector, in accordance with an embodiment.

Further aspects and features of the example embodiments described herein will appear from the following description taken together with the accompanying drawings.

DETAILED DESCRIPTION

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms "coupled" or "coupling" can have a mechanical, optical or electrical connotation. For example, as used herein, the terms "coupled" or "coupling" can indicate that two elements or devices can be directly connected to one another or connected to one another through one or more intermediate elements or devices via an electrical signal, an electrical connection, a mechanical element, an optical element, or a light pathway depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies. For example, the expression "about 120 degrees" may mean+/−10% of 120 degrees (between 109 and 132 degrees).

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

The terms "an embodiment", "embodiment", "embodiments", "the embodiment", "the embodiments", "one or more embodiments", "some embodiments", "at least one embodiment", and "one embodiment" mean one or more (but not all) embodiments of the claimed subject matter, unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

In addition, some elements herein may be identified by a part number, which is composed of a base number followed by an alphabetical or subscript-numerical suffix (e.g. $112a$, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

Electricians encounter many different types of electrical enclosures in their line of work, such as, for example, junction boxes, outlet boxes, circuit panels, etc. At a high level, work on each electrical enclosure may be classified as either a base build or a renovation. When base building, the electrical enclosure is generally empty. Accordingly, the electrician is able to start their work from scratch. On the other hand, when performing renovation work, the electrical enclosure often contains existing circuitry and/or wiring. As a result, safety concerns and internal space limitations are usually more prevalent for electricians renovating electrical enclosures that have already been in use. However, regardless of whether they are empty or full, electrical enclosures present electricians with numerous challenges when attempting to pass electrical components such as cable, wire, and the like, into the electrical enclosure.

Electrical conduit connectors are commonly used to facilitate the attachment of a conduit or cable to an electrical enclosure, such as, for example, a junction box, an outlet box, a circuit panel, etc. These conduit connectors are typically integrated with an adapter end opposite to an end that is connectable to the electrical enclosure. The adapter end may permit attachment of a conduit, cable or the like to the conduit connector. One or more wires may be routed (i.e. passed) through the conduit, the electrical conduit connector and into the electrical enclosure. As will be described in more detail below, current electrical conduit connectors can plague electricians with a significant amount of installation challenges, safety concerns, lost parts, and general frustration.

Multipart conduit connectors are perhaps the most commonly used conduit connector for coupling conduits to electrical enclosures. Such multipart conduit connectors typically include at least i) a connector body having a threaded male end and ii) a threaded female lock nut. The threaded male end is inserted into the electrical enclosure through a knockout (i.e. a hole in the electrical enclosure's wall). A rigid connection is provided by, first, engaging the threaded female lock nut with the threaded male end of the connector body inside the electrical enclosure, and then rotating the lock nut until it is tight against an internal surface of the electrical enclosure. In most cases, the connector body is integrated with an adapter end opposite the threaded male end. As noted above, the adapter ends permits attachment of conduits, cables and the like.

Current multipart conduit connectors have a number of deficiencies. First off, multipart conduit connectors are usually preassembled when shipped from the manufacturer. By design, the lock nut is sized so it does not fit through the knockout. As a result, the electrician must first completely separate the threaded female lock nut from the threaded male end of the connector body before it can be inserted through the knockout. Once the threaded male end of the connector body is inserted though the knockout, the electrician must then rethread the lock nut with the male end of connector body. This rethreading is done inside the electrical enclosure. Two hands are needed to both i) remove the lock nut and ii) rethread the lock nut inside the electrical enclosure. In particular, rethreading the lock nut with the male end of the connector body can be challenging, often requiring significant dexterity and/or coordination. The challenge can be even more difficult for installations where the electrician is unable to see inside the electrical enclosure. For even more of a challenge, the electrical enclosure may be located in an elevated, crammed, poorly lit and/or otherwise difficult to access space. In these cases, rethreading the lock nut with the threaded male end of the conduit connector inside the electrical enclosure may be next to impossible.

As noted above, current multipart conduit connectors are typically shipped from the manufacturer and/or distributor preassembled. That is, they come with the threaded female lock nut engaged with the threaded male end of the connector body. During shipping, it is quite common for vibrations, orientation changes, and/or other various movements to disengage (i.e. separate) the lock nut from the connector body. Incidences of lock nuts falling off during shipping and/or before installation is a more common issue that one might expect. For example, an electrician may order 100 conduit connectors for a manufacturer. When the order is delivered, the electrician may discover that a number (e.g. 5-15, or more) of the conduit connectors are missing their corresponding lock nut (it has fallen off during shipping). These conduit connectors are useless without their corresponding lock nuts.

Once the electrician manages to rethread the lock nut, it must be firmly secured against an internal surface of the electrical enclosure. Building codes in many jurisdictions require that conduit connectors be firmly and reliably connected to electrical enclosures. Lock nuts that have not been firmly connected can eventually loosen. Those skilled in the art will appreciate that a loose conduit connector can cause great strain to the electrical wires and their connections, resulting in an increased likelihood of an electrical fire or other electrical problems, such as poor grounding. Accordingly, in order to apply sufficient torque for such a firm and reliable connection, the electrician may use a tool, e.g. a flat-head screwdriver, pliers, a wrench, a specialized locknut wrench, and/or a hammer, to tighten the lock nut against the internal surface of the electrical enclosure. Serious safety issues may occur when an electrician inserts one of their tools (or another object) into an electrical enclosure possibly containing live wires (e.g. renovation work).

Owing to the fact that the lock nut must be completely separated from the connector body before installation, it is quite common for an electrician to accidently drop or misplace the lock nut. Dropped or misplaced lock nuts may be hard to retrieve and, in some cases, irretrievable. This may especially be the case when the electrical enclosure is located in a difficult to access area (e.g. in the rafters, above ceilings, etc.). If the electrician tries to retrieve a dropped lock nut, installation will take more time. In cases where the lock nut is lost, the conduit connector is useless if a replacement lock nut (of the same size) is not readily available. Not only does this frustrate the electrician performing the installation, ultimately it leads to elevated parts and labor costs (lost parts and longer installation times accumulate over multiple installations).

Another issue with current multipart conduit connectors is the distance that the threaded male end protrudes into the interior of the electrical enclosure. In many cases, the male threaded end extends well past the depth of the lock nut. For renovation work, in particular, the male threaded end may interfere with existing circuitry and wires in the electrical enclosure, e.g. causing shorts and/or wire fatigue. When multiple conduit connectors are attached to the electrical enclosure (i.e. at corresponding knockouts), space limitations within the electrical enclosure may become a serious issue. In these cases, adjacent lock nuts and/or connector bodies may interfere with one another inside the electrical enclosure. Some electricians, when working on a limited space enclosure, are forced to saw off excess thread from the threaded male end of the connector body. In other cases, the electrician may elect to cut away some of the electrical enclosure, cut off portions of the mounting screws, or perform a combination of space enlarging modifications. Those skilled in the art will appreciate that these modifications may increase installation time and/or threaten the structural integrity of the electrical enclosure as a whole.

Disassembly of current multipart connectors from electrical enclosures may be just as challenging as their installation, if not more challenging. For example, if the conduit connector was modified during installation to enlarge space, e.g. as described above, disassembly may be exceedingly difficult or, in some cases, impossible. Additionally, if the threads of either the lock nut or male end of the connector body are damaged during disassembly, the multipart conduit connector may not be reusable. If the lock nut was tightened with a tool during installation (e.g. by wrench), then, in all likelihood, the lock nut must be removed with a tool. Again, this may involve inserting the tool into an electrical enclosure that contains live wires, thereby creating safety issues. As with installation, if the lock nut is lost or misplaced during disassembly, it must be replaced in order for the multipart conduit connector to be used again.

One or more wires may be routed (e.g. fed or pulled) into the electrical enclosure through the connector body. Sharp edges around the terminus of the threaded male end can damage (e.g. cut, fray and/or otherwise fatigue) the wire as it passes into the electrical enclosure. Those skilled in the art will appreciate that frayed or damaged wire may spark and cause a fire. As a result, building codes in many jurisdictions require that a bushing be used to smooth the wire's transition from the connector body into the electrical enclosure, thereby reducing wire fatigue. Current bushings are usually made of plastic and can be press or snap fitted into the threaded male end of the connector body. However, as the wire is routed into the electrical enclosure, it commonly tears through these bushings rendering them useless. Adding further to frustration, each bushing needs to specifically correspond to the threaded male end's internal diameter; otherwise, it may not be properly secured. This means that the electrician may need to keep bushings of many different sizes on hand.

Out of necessity, the threaded female lock nut has a larger outer diameter than the threaded male end of the connector body. In cases where the knockout is formed very close to a corner of the electrical enclosure, that corner may interfere with rethreading the lock nut with the male end of the connector body. Unfortunately, in these cases, this means there is not enough room for the lock nut to be rethreaded with the male end of the connector body within the electrical enclosure.

Other than the multipart conduit connectors discussed above, snap-in conduit connectors are perhaps the next most commonly used conduit connector for coupling conduits to electrical enclosures. Current snap-in conduit connectors present similar shortcomings and limitations to those of current multipart conduit connectors that are discussed above. In addition, a significant problem related to snap-in conduit connectors is their general inability to establish rigid and reliable connection to the electrical enclosure (e.g. junction box, circuit panel, etc.). The snap ring of current snap-in conduit connectors is configured to accommodate for a variety of enclosure wall thicknesses so that the same snap-in conduit connector can be connected to many different electrical enclosures. Those skilled in the art will appreciate that a loose connection may prevent proper electrical grounding due to electrical continuity problems at the loose connection.

The installation of electrical systems can be labour intensive and, in turn, costly. The deficiencies of current conduit connectors discussed above are a significant contributor in generating such labor intensiveness. Embodiments disclosed herein relate to improved electrical conduit connectors that can be rigidly attached to electrical enclosures for the purposes of connecting various types of conduits and cables to the electrical enclosure.

The electrical enclosure may be one of a number of electrical enclosures, such as, for example, a junction box, an outlet box, a transformer enclosure, a circuit panel, or a lighting fixture. Similarly, the conduit may be one of a number of conduits, such as, for example, a rigid conduit, a flexible conduit, a hose, other tubing capable of routing electrical wire, or cable. The cable may be non-metallic sheathed cable, portable cable, armored cable, or a variety of other types of cable. Therefore, as used in this disclosure, the terms "electrical enclosure" and "conduit" are not intended to be limited to any one type of electrical enclosure and/or conduit.

The electrical conduit connectors disclosed herein overcome many of the shortcomings and limitations of current conduit connectors (e.g. discussed above) as well as provide for one or more additional advantages. In one aspect, at least one embodiment of the electrical conduit connectors disclosed herein may offer simpler, quicker and/or safer installation and disassembly. In another aspect, at least one embodiment of the electrical conduit connectors disclosed herein may take up less of the valuable interior space of the electrical enclosure.

In yet another aspect, at least one embodiment of the electrical conduit connectors disclosed herein may prevent misplacing or losing the lock nut needed to firmly secure the corresponding connector body to the electrical enclosure. In still yet another aspect, at least one embodiment of the electrical conduit connectors disclosed herein may reduce wire damage typically caused as the wire passes into the electrical enclosure from the connector body. In still yet another aspect, at least one embodiment of the electrical conduit connectors disclosed herein may provide for a rigid and reliable attachment at a knockout by engaging a substantial portion of the electrical enclosure's internal surface surrounding that knockout.

Furthermore, at least one embodiment of the electrical conduit connectors described herein can be firmly secured to an electrical enclosure quickly and easily (e.g. without tools and/or with one hand), does not require access to the interior of the electrical enclosure, and/or does not need to be disassembled before it can be connected to the electrical enclosure. Thus, the use of one of the embodiments of the electrical conduit connectors disclosed herein may lead to efficient installation and disassembly, reduce risk of injury, reduce the need of space enlarging modifications, improve connection to the electrical enclosure, reduce labor cost, reduce parts cost, or a combination thereof. Additional advantages of using the electrical conduit connectors disclosed herein will be described below.

FIGS. 1A-1E illustrate an electrical conduit connector, referred to generally as 100, in accordance with an embodiment. Electrical conduit connector 100 includes a connector body 102 and a lock nut 104. As will be described below, electrical conduit connector 100 may be used to couple a variety of conduits to a variety of electrical enclosures.

As shown, connector body 102 extends longitudinally between a proximal electrical enclosure end $102_1$ and a distal conduit end $102_2$. Connector body 102 has an electrical enclosure port 106 at the electrical enclosure end $102_1$, a conduit port 108 at the conduit end $102_2$, and an internal passage 110 extending between electrical enclosure port 106 and conduit port 108. In the example shown, internal passage 110 is cylindrical. However, in one or more alternative embodiments, internal passage 110 may be another suitable shape, e.g. rectangular, elliptical, etc. As will be described below, conduit port 108 and/or internal passage 110 may be configured to correspond to the type of the conduit being coupled to the electrical enclosure.

Figure 1B:
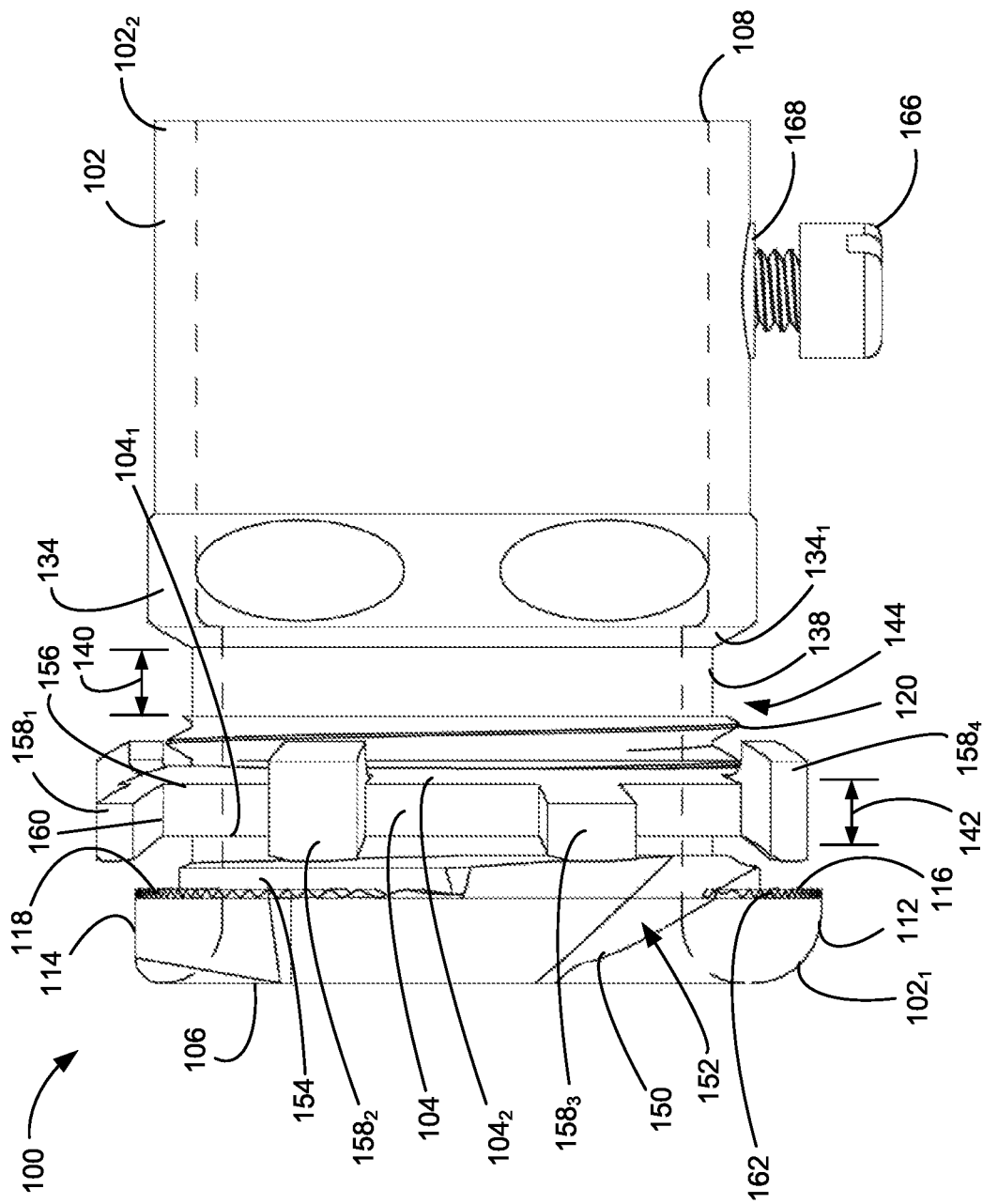
FIG. 1B is a side view of the electrical conduit connector of FIG. 1A.
Figure 1E:
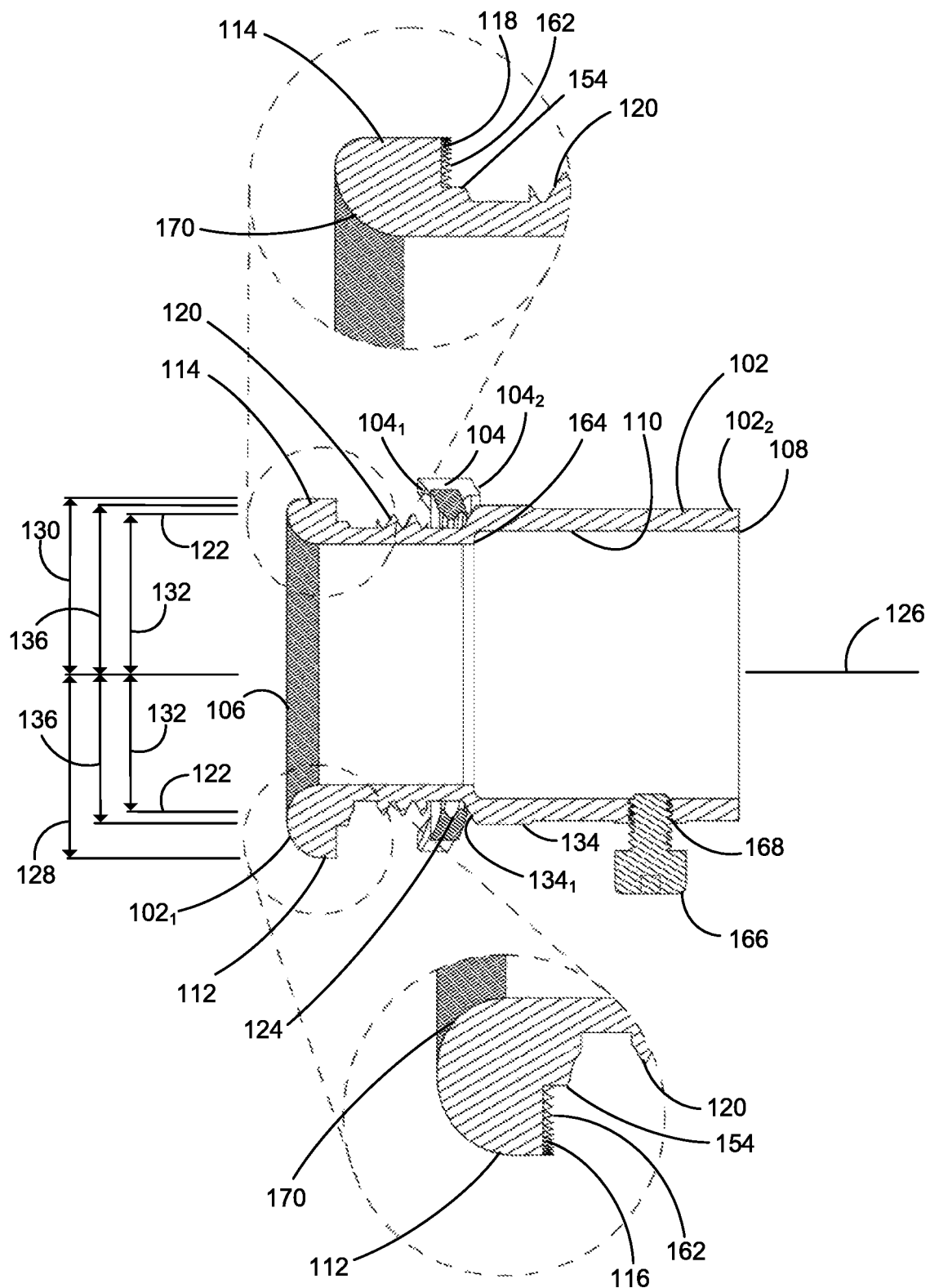
FIG. 1E is a cross-sectional view taken along line E-E in FIG. 1A with exploded views of both its first and second retention tabs.

As perhaps best shown in FIG. 1E, electrical enclosure end $102_1$ has radially opposed first and second retention tabs 112 and 114. As shown, first and second retention tabs 112 and 114 each extend radially outward from connector body 102 at electrical enclosure end $102_1$. When connecting electrical conduit connector 100 to an electrical enclosure, first and second retention tabs 112 and 114 may be passed through a knockout of the electrical enclosure (e.g. by angling connector body 102 with respect to the knockout). First retention tab 112 has a distal facing enclosure engagement side 116. Similarly, second retention tab 114 has a distal facing enclosure engagement side 118. As will be described below, once retention tabs 112 and 114 have passed through the knockout, connector body 102 may be reoriented so that enclosure engagements sides 116 and 118 of respective retention tabs 112 and 114 engage an internal surface of the electrical enclosure surrounding the knockout.

Referring to FIGS. 1A and 1E, connector body 102 has external body threads 120 located distally of first and second retention tabs 112 and 114. Lock nut 104 may be mated with the external body threads 120. In the example shown, lock nut 104 has internal nut threads 124 that mate with external body threads 120 of connector body 102.

With reference to FIGS. 1A and 1B, lock nut 104 has an enclosure engagement end $104_1$ that is opposed to enclosure engagement sides 116 and 118 of retention tabs 112 and 114. Lock nut 104 is rotatable on the external body threads 120 of connector body 102 to advance enclosure engagement end $104_1$ toward retention tabs 112 and 114. As will be described below, lock nut 104 may be rotated (outside the electrical enclosure) to firmly secure enclosure engagement sides 116 and 118 of retention tabs 112 and 114 against the internal surface of the electrical enclosure surrounding the knockout.

Referring to FIG. 1E, in the example shown, both first and second retention tabs 112 and 114 extend radially outward of a longitudinal projection 122 of external body threads 120. As shown, internal passage 110 defines a longitudinal centre line 126. First retention tab 112 has a first radial extent 128 from centre line 126. Similarly, second retention tab 114 has a second radial extent 130 from centre line 126. External body threads 120 of connector body 102 have a thread radial extent 132 from centre line 126. As shown, both first and second radial extents 128 and 130 are larger than thread radial extent 132. Because of this, first and second retention tabs 112 and 114 may obstruct and/or prevent removal of lock nut 104 from connector body 102 at electrical enclosure end $102_1$. As lock nut 104 is advanced toward electrical enclosure end $102_1$, contact between i) enclosure engagement sides 116 and 118 of first and second retention tabs 112 and 114, and ii) enclosure engagement end $104_1$ of lock nut 104 may obstruct and/or prevent further advancement of the lock nut 104 toward electrical enclosure end $102_1$.

As perhaps best shown in FIGS. 1C and 1E, first radial extent 128 of first retention tab 112 is larger than second radial extent 130 of second retention tab 114. As will be described below, this may facilitate installation. In one or more alternative embodiments, first and second radial extents 128 and 130 may be equal.

In the example shown, connector body 102 includes a shoulder 134 that is located distally of external body threads 120. With reference to FIG. 1E, shoulder 134 has a shoulder radial extent 136 from centre line 126 that is larger than thread radial extent 132. Because of this, shoulder 134 may obstruct and/or prevent removal of lock nut 104 from connector body 102 at conduit end $102_2$. Referring back to FIG. 1B, lock nut 104 has a shoulder engagement end $104_2$ that is opposed to enclosure engagement end $104_1$. Shoulder 134 has a proximal facing lock nut engagement side $134_1$ that is opposed to shoulder engagement end $104_2$ of lock nut 104. As lock nut 104 is advanced toward conduit end $102_2$ of connector body 102, contact between i) shoulder engagement end $104_2$ of lock nut 104, and ii) lock nut engagement side $134_1$ of shoulder 134 obstructs and/or prevents further advancement of lock nut 104 toward conduit end $102_2$.

In embodiments where removal of lock nut 104 from both electrical enclosure end $102_1$ and conduit end $102_2$ of connector body 102 is prevented (e.g. as described above), lock nut 104 is trapped on connector body 102. In such embodiments, electrical conduit connector 100 may be classified as a "one-piece" electrical conduit connector. Any chance of misplacing or losing the corresponding lock nut 104 of connector body 102 may be eliminated. Not only can this provide for a less frustrating installation, it may also reduce part costs because fewer replacement parts may be needed and/or fewer parts may go unused.

In at least one embodiment, connector body 102 and lock nut 104 may be formed together when manufactured. Referring to FIG. 1B, in the example shown, connector body 102 has an external surface 138 that is located between external body threads 120 and shoulder 134. External surface 138 has a longitudinal depth 140 (between a distal end of external body threads 120 and lock nut engagement side $134_1$ of shoulder 134). Lock nut 104 has a longitudinal depth 142 (between enclosure engagement end $104_1$ and shoulder engagement end $104_2$). Longitudinal depth 140 of external surface 138 may be equal to or greater than longitudinal depth 142 of lock nut 104. In the example shown, longitudinal depth 140 of external surface 138 is slightly greater than longitudinal depth 142 of lock nut 104. Accordingly, external surface 138 may provide a casting or printing region 144 around which lock nut 104 is formed during manufacturing. Since connector body 102 and lock nut 104 are inseparable from their inception, neither connector body 102 nor lock nut 104 can be lost or misplaced in relation to the other, e.g. any time during and after manufacturing.

Figure 2:
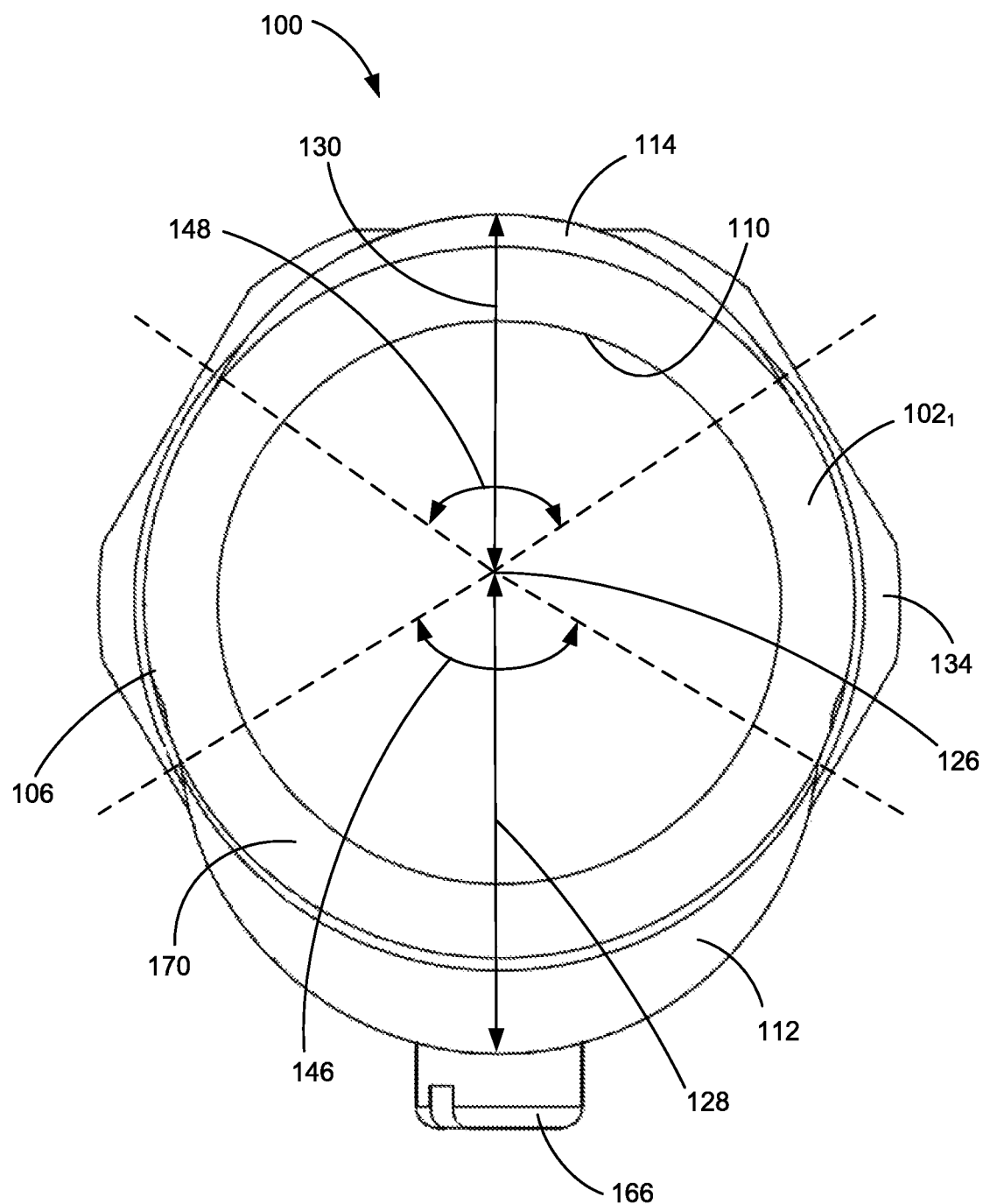
FIG. 2 is a top view of the electrical conduit connector of FIG. 1A with its lock nut omitted.

Reference is now made to FIG. 2. In FIG. 2, lock nut 104 is omitted from electrical conduit connector 100 for illustrative purposes. In at least one embodiment i) first retention tab 112 has a first circumferential extent 146 between 90 and 125 degrees, and ii) second retention tab 114 has a second circumferential extent 148 between 90 and 105 degrees. As shown, circumferential extents 146 and 148 are taken from centre line 126. Accordingly, in such embodiments, first and second retention tabs 112 and 114 may have a collective circumferential extent between 180 and 230 degrees (collective circumferential extent=first circumferential extent 146+second circumferential extent 148).

In a preferred embodiment, first and second circumferential extents 146 and 148 are each at their maximal value that still allows entry of first and second retention tabs 112 and 114 to pass through the knockout. For example, referring to FIG. 2, first circumferential extent 146 is 125 degrees and second circumferential extent 148 is 105 degrees. Thus, in the example shown, first and second retention tabs 112 and 114 have a collective circumferential extent of about 230 degrees. This may provide for a sturdy and reliable connection because surface-to-surface contact between i) enclosure engagements sides 116 and 118 of respective retention tabs 112 and 114 and ii) the internal surface of the electrical enclosure may surround a significant portion of the knockout's circumference (e.g. up to 230 degrees).

Increasing first and second radial extents 128 and 130 of respective first and second retention tabs 112 and 114 may also increase surface-to-surface contact between i) enclosure engagements sides 116 and 118 of respective retention tabs 112 and 114 and ii) the internal surface of the electrical enclosure. However, when first and second radial extents 128 and 130 are excessively large, they may obstruct use of adjacent knockouts and/or interfere with other components within the electrical enclosure. Optimizing the size of first and second circumferential extents 146 and 148 of respective first and second retention tabs 112 and 114 has shown to be an effective means of providing a strong and reliable connection between electrical conduit connector 100 and the electrical enclosure without the need of excessively large first and second radial extents 128 and 130.

With reference to FIGS. 1A-1C, electrical enclosure end $102_1$ of connector body 102 has an arcuate groove 150 that extends from one side of first circumferential extent 146 at electrical enclosure end $102_1$, distally around first retention tab 112, to the other side of first circumferential extent 146 at electrical enclosure end $102_1$. Arcuate groove 150 defines a knockout insertion band, referred to generally as 152. As will be described below, knockout insertion band 152 may provide the necessary tolerance that allows first retention tab 112 to pass through the knockout. For example, knockout insertion band 152 may allow first retention tab 112, having a first circumferential extent 146 of about 125 degrees, to pass through the knockout.

As perhaps best shown in FIGS. 1B and 1E, in the example shown, electrical enclosure end $102_1$ of connector body 102 has a stabilizing ring 154 that is located immediately distal of first and second retention tabs 112 and 114. Stabilizing ring 154 preferably has a diameter that is slightly smaller than that of the knockout. By virtue of its location (immediately distal of retention tabs 112 and 114), stabilizing ring 154 at least partially sits within the knockout. Having a diameter generally corresponding to the knockout's diameter, stabilizing ring 154 is able to stabilize the connection between electrical conduit connector 100 and the electrical enclosure, e.g. by preventing wobble and/or drift of connector body 102 in the radial direction relative to the knockout. With reference to FIGS. 1A-1C, in the example shown, arcuate groove 150 extends through stabilizing ring 154 as it extends distally from both sides of first circumferential extent 146.

Referring to FIGS. 1A and 1B, lock nut 104 may include a lock nut body 156 and a plurality of enclosure engagement teeth 158 that extend radially outwardly and proximally from lock nut body 156. In the example shown, there are eight enclosure engagement teeth $158_1$, $158_2$, $158_3$, $158_4$, $158_5$, $158_6$, $158_7$, and $158_8$ distributed at a regular interval around lock nut body 156. In alternative embodiments, there may be more or less enclosure engagement teeth 158 distributed at a regular or irregular interval.

As lock nut 104 is advanced toward electrical enclosure end $102_1$ of connector body 102, contact between i) enclosure engagement teeth 158 and ii) an external surface of the electrical enclosure around the knockout may act to strengthen the connection between electrical conduit connector 100 and the electrical enclosure. As perhaps best shown in FIG. 1B, by extending proximally from the lock nut body 156, enclosure engagement teeth 158 are able to impinge upon the external surface of the electrical enclosure surrounding the knockout as lock nut 104 advances toward electrical enclosure end $102_1$. This may strengthen the engagement between lock nut 104 and the electrical enclosure and, in turn, improve the rigidity of the connection between connector body 102 and the electrical enclosure.

Lock nut 104 may be advanced toward electrical enclosure end $102_1$ by hand, by tool, or combination thereof, from outside the electrical enclosure. That is, an electrician does not need to put either their hand or a tool into the electrical enclosure to advance and/or tighten lock nut 104. Accordingly, use of electrical conduit connector 100 may facilitate safer installation. For example, the electrician may elect to initially advance lock nut 104 by hand and then tighten lock nut 104 against the external surface of the electrical enclosure with a tool. In order to apply sufficient torque to produce a firm and reliable connection, the electrician may use the tool, e.g. a flat-head screwdriver, pliers, a wrench, a specialized locknut wrench and/or a hammer, to tighten lock nut 104 against the external surface of the electrical enclosure. Enclosure engagement teeth 158 may provide the electrician with a convenient location in which to position such a tool to apply such a torque for tightening (or loosening) lock nut 104. For example, referring to FIG. 1B, the electrician may place the tip of a flat-head screwdriver (not shown) at a junction 160 between enclosure engagement tooth $158_1$ and lock nut body 156 and then apply a torque to lock nut 104 by pushing the screwdriver toward junction 160.

Referring to FIG. 1E, enclosure engagement sides 116 and 118 of respective first and second retention tabs 112 and 114 may have one or more enclosure-gripping features 162. Enclosure-gripping features 162 may reduce the relative motion between i) first and second retention tabs 112 and 114, and ii) the internal surface of the electrical enclosure surrounding the knockout. Enclosure-gripping features 162 may be an adhesive, a rubber-like gasket, or a combination thereof. In the example shown, enclosure-gripping features 162 are a plurality of mini-protuberances that project distally from enclosure engagement sides 116 and 118. Such mini-protuberances may provide a coarse surface that increases friction between i) enclosure engagement sides 116 and 118, and ii) the internal surface of the electrical enclosure surrounding the knockout. Alternatively, enclosure-gripping features 162 may not be provided.

Conduit port 108 may receive a variety of conduits. In the example shown, conduit port 108 may receive a tubular conduit (e.g. see tubular conduit 400 in FIGS. 10-12). Referring to FIG. 1B, in the example shown, a conduit stop 164 projects radially inward from connector body 102 into internal passage 110. The distance that a conduit can be inserted into internal passage 110 from conduit port 108 is limited by conduit stop 164 and may be referred to as a conduit insertion distance. It will be appreciated that the conduit insertion distance may be varied by moving conduit stop 164 toward or away from conduit end $102_2$. For example, this may be done to accommodate for a specific type of conduit. Alternatively, conduit stop 164 may not be provided.

As perhaps best shown in FIGS. 1B and 1E, electrical conduit connector 100 may include a compression screw 166 to hold the conduit within internal passage 110. As shown, compression screw 166 is mated with a threaded bore 168 that is defined in connector body 102 between conduit stop 164 and conduit end $102_2$. As will be described below, once the conduit has been positioned within the internal passage 110 (e.g. with a proximal end of the conduit abutting the conduit stop 164), compression screw 166 may be advanced (i.e. rotated) until it firmly engages the conduit, thereby holding the conduit in place within internal passage 110. In alternative embodiments, other suitable means of holding the conduit within internal passage 110 may be used, e.g. adhesive, clamps, and other suitable mechanical fasteners.

Referring still to FIG. 1E, in the example shown, internal passage 110 has a fillet 170 at electrical enclosure port 106 to smooth transition into and out of internal passage 110. As discussed above, as electrical wiring is routed into the electrical enclosure it is often fatigued (or even cut) exiting the connector body due to its sharp outer edge. As a result, building codes across many jurisdictions require that a bushing be added to prevent such wire fatigue, e.g. by effectively covering the sharp outer edge. Fillet 170 may prevent the need for such a bushing as the transition from into and out of the internal passage at electrical enclosure port 106 may be sufficiently smooth to prevent wire damage. Fillet 170 may have a radius of curvature between 1 and 100 mm. More preferably, for example, fillet 170 may have a radius of curvature between 1 and 15 mm. In the example shown, fillet 170 has a radius of curvature of about 5 mm.

Electrical conduit connector 100 may be made of metal (e.g. stainless steel, aluminum alloy, etc.), plastic (e.g. polyvinyl-chloride (PVC), acrylonitrile-butadiene-styrene (ABS), etc.), or a combination thereof. The specific composition of electrical conduit connector 100 may be selected according to its intended use and/or raw material costs. For example, stainless steel may be selected because it can provide desirable strength and/or durability characteristics. Alternatively, the material that electrical conduit connector 100 is made of may be selected to match that of the conduit being connected at conduit port 108. For example, when the conduit to be connected is a PVC pipe, electrical conduit connector 100 may similarly be made of PVC.

Reference is now made to FIGS. 3-8 for illustration of an exemplary process of securing electrical conduit connector 100 of FIGS. 1A-1E to an outlet box 300. As described above, outlet box 300 is one of many types of electrical enclosures. Other types of electrical enclosures may include, for example, junction boxes, circuit panels, transformer enclosures, and fixture boxes. Outlet box 300 is used for illustrative purposes and is not intended to be limiting. The electrical conduit connector disclosed herein may be attached to other types of electrical enclosures in a similar fashion.

Figure 3:
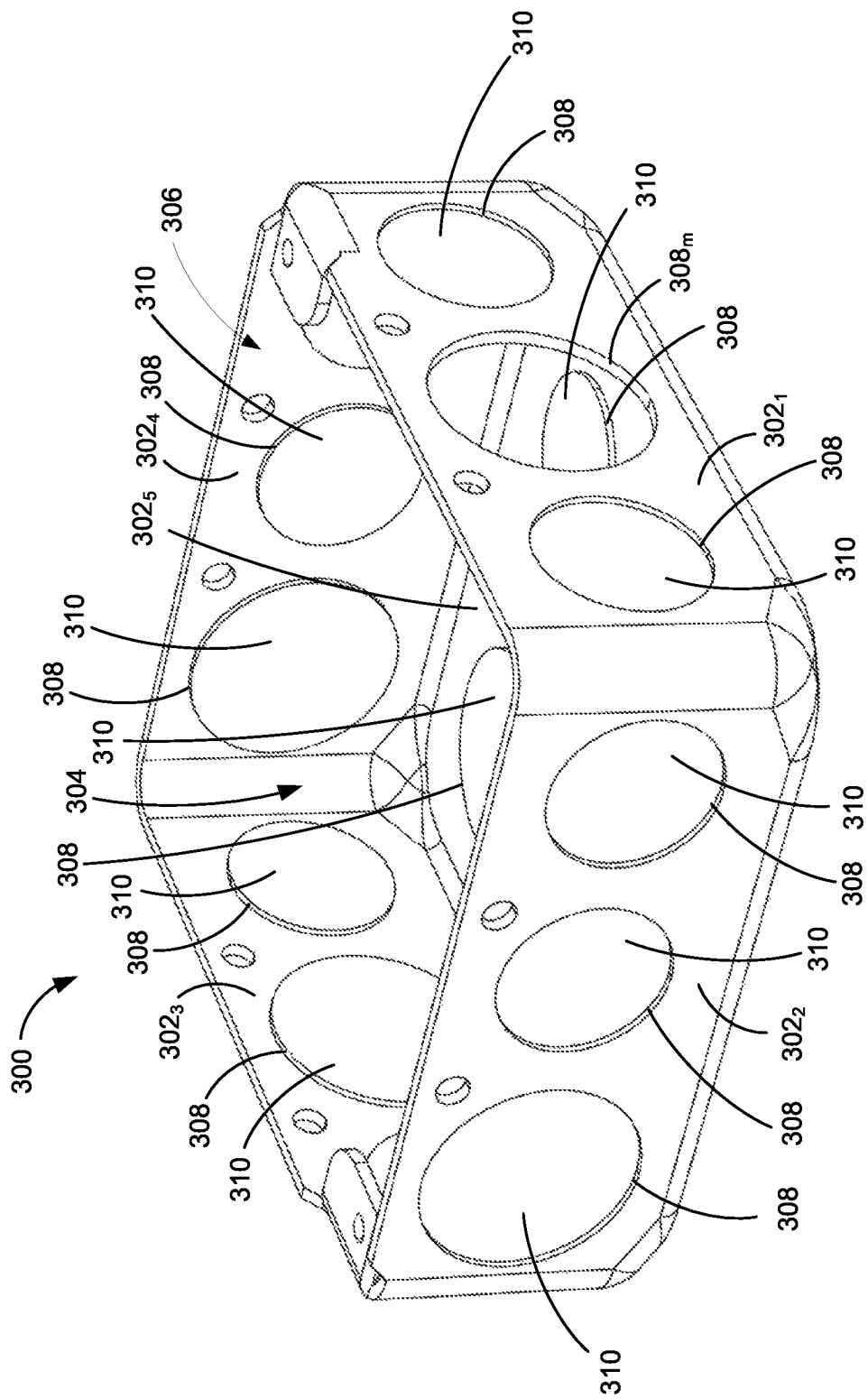
FIG. 3 is a perspective view of an outlet box having a plurality of knockouts.

Referring to FIG. 3, outlet box 300 includes a first pair of opposed sidewalls $302_1$ and $302_3$, a second pair of opposed sidewalls $302_2$ and $302_4$, and a base wall $302_5$. Walls $302_1$-$302_5$ define an interior enclosure space 304 that is accessible from an open end 306 opposite base wall $302_5$. In many cases, open end 306 is eventually covered by a panel, shield, plate or the like (not shown) to shield internal components. As shown, each wall $302_1$-$302_5$ includes multiple pre-fabricated knockouts 308 formed therein. Outlet box 300 (as well as other types of electrical enclosures) may be made from metal (e.g. stainless steel), plastic, or another suitable material or combination of materials.

As needed, one or more knockouts 308 may be exposed by "knocking out" its corresponding cover plate 310 (e.g. with a blunt object). In the example shown, the middle knockout 308m of sidewall $302_1$ is exposed. That is, its corresponding cover plate has been removed (i.e. "knocked out"). In alternative embodiments, more (e.g. 5) or less (e.g. 0) pre-fabricated knockouts 308 may be provided in each of walls $302_1$-$302_5$. Alternatively, or in addition, an electrician may cut or stamp their own knockouts in one or more walls $302_1$-$302_5$ as desired (e.g. on site with punch and die set or a drill bit).

For illustrative purposes, FIGS. 4-8 show electrical conduit connector 100 of FIGS. 1A-1E being attached to outlet box 300 of FIG. 3 at the exposed middle knockout 308m of sidewall $302_1$. The same process described below may be followed for attaching electrical conduit connector 100 to any of the other prefabricated knockouts 308 once their corresponding cover plates 310 have been removed.

Figure 4:
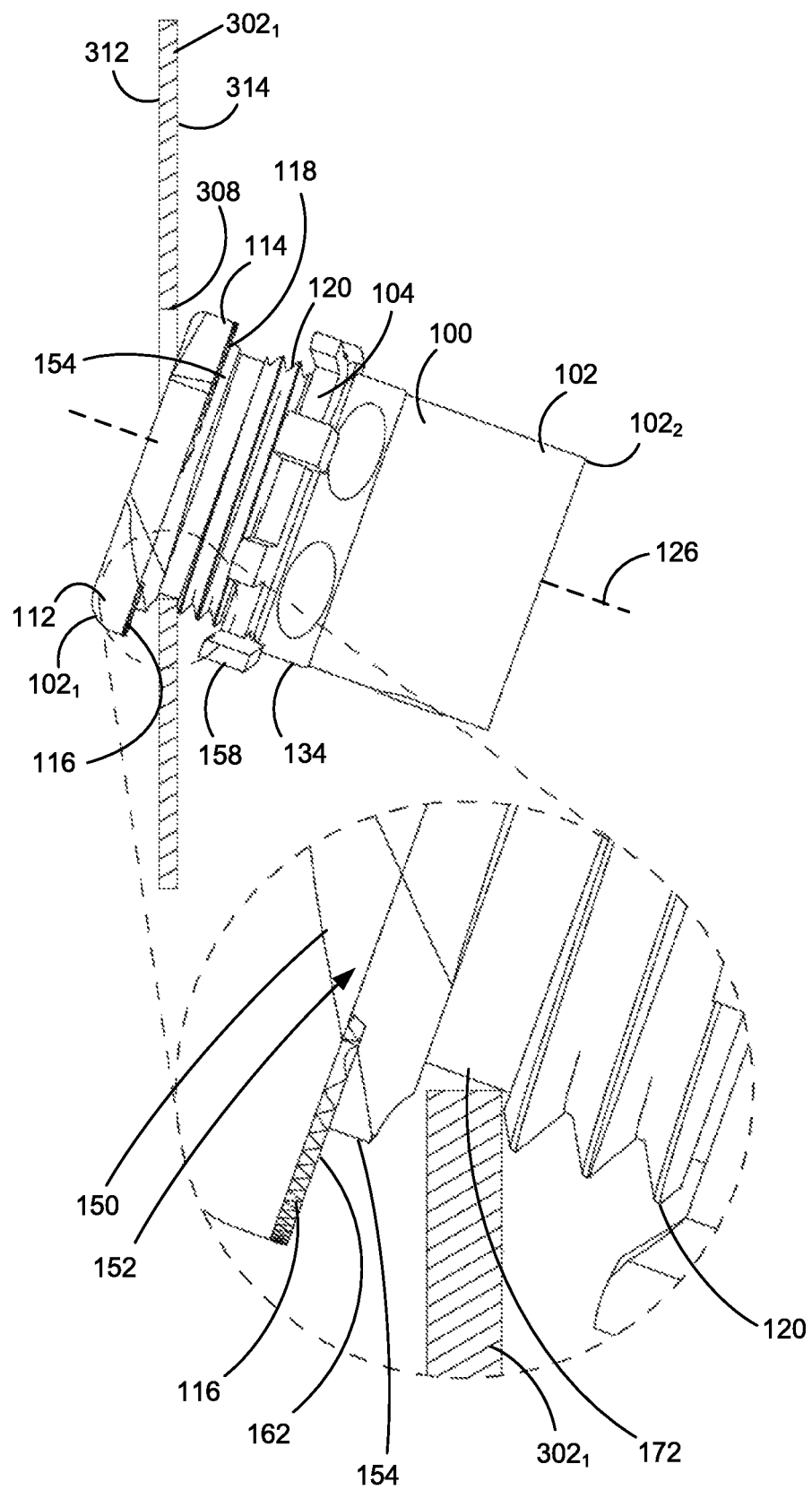
FIG. 4 is a cutaway view illustrating a first step in connecting the electrical conduit connector of FIGS. 1A-1E to the outlet box of FIG. 3, with an exploded view of an engagement between the connector's body and a knockout of the outlet box.

Referring to FIG. 4, first retention tab 112 has been passed through knockout 308 from the outside of outlet box 300 by angling connector body 102 so that centre line 126 is not orthogonal to the knockout 308. As described above, knockout insertion band 152 may provide the necessary clearance to allow first retention tab 112 to pass through knockout 308. In at least one embodiment, engagement between knockout 308 and knockout insertion band 152 may allow connector body 102 to hang from knockout 308 without external support (e.g. from the electrician). This may facilitate installation by freeing up one of the electrician's hands for another task.

Figure 5:
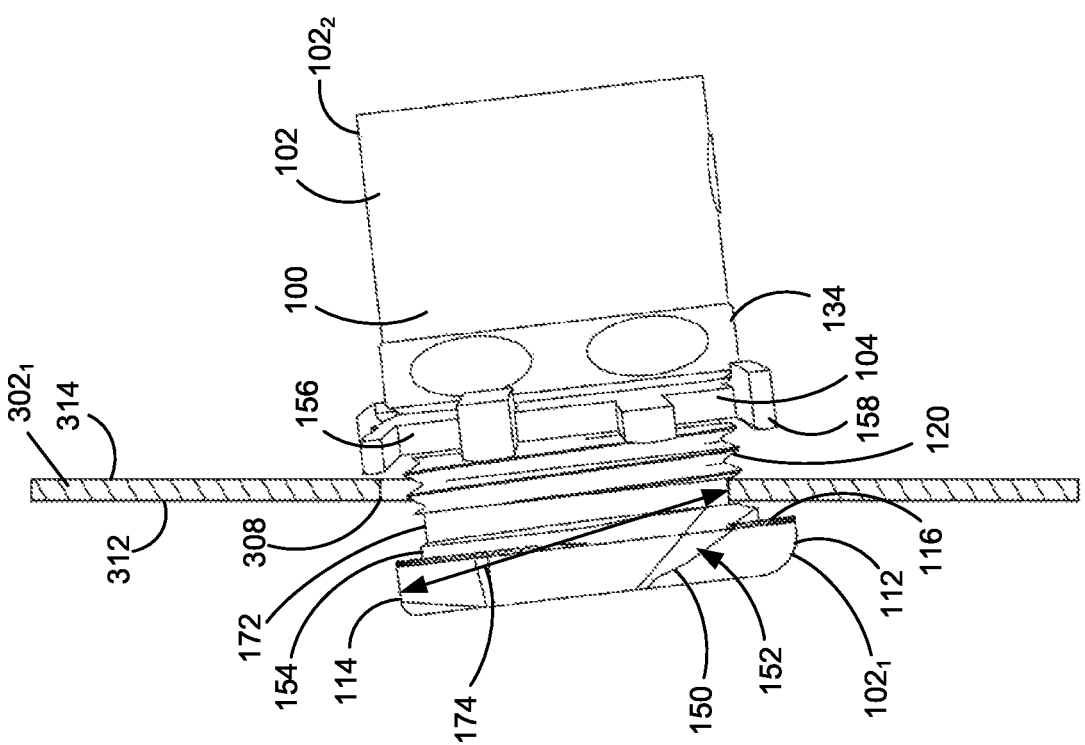
FIG. 5 is a cutaway view illustrating a further step in connecting the electrical conduit connector of FIGS. 1A-1E to the outlet box of FIG. 3.

With reference to FIGS. 4 and 5, once first retention tab 112 is inside outlet box 300, the edge of knockout 308 is brought into contact with a root surface 172 of connector body 102. As shown, root surface 172 is located immediately proximal of external body threads 120 (e.g. between stabilizing ring 154 and external body threads 120). In such a position, connector body 102 may be rotated so that second retention tab 114 passes through knockout 308. In order for second retention tab 114 to pass unobstructed through knockout 308, a distance 174 between the outer edge of second retention tab 114 and root surface 172 is slightly smaller than the diameter of knockout 308. Knockout diameters may have a tolerance range of ±0.5 mm. Accordingly, to ensure passage of second retention tab 114 through knockout 308, distance 174 may be generally set about 0.5 to 0.8 mm smaller than the expected diameter of knockout 308.

Figure 6:
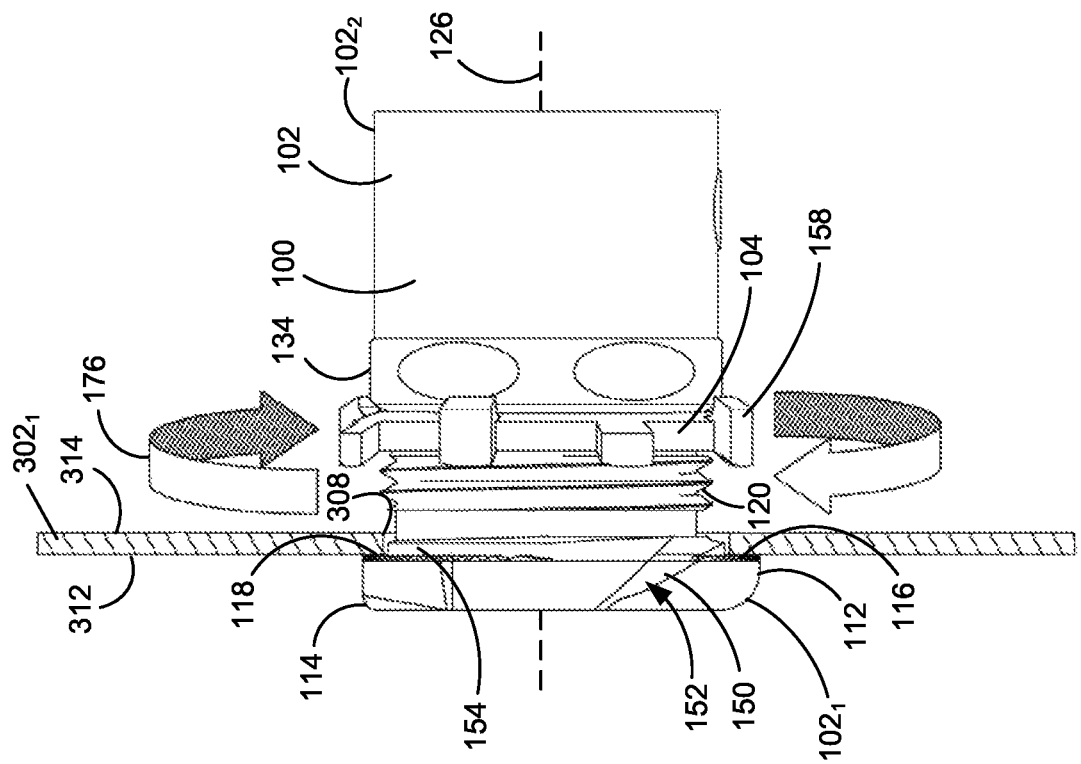
FIG. 6 is a cutaway view illustrating yet a further step in connecting the electrical conduit connector of FIGS. 1A-E to the outlet box of FIG. 3.

Referring to FIG. 6, connector body 102 may then be reoriented so that centre line 126 is generally orthogonal to knockout 308. As shown, in such an orientation, enclosure engagement sides 116 and 118 of respective first and second retention tabs 112 and 114 may be brought into contact with an internal surface 312 of sidewall $302_1$. Connector body 102 may be rigidly attached to outlet box 300 by rotating lock nut 104 (e.g. in clockwise direction 176) so that enclosure engagement end $104_1$ of lock nut 104 is drawn tight against an external surface 314 of sidewall $302_1$, as shown in FIGS. 7 and 8. As described above, lock nut 104 may be advanced toward retention tabs 112 and 114 and tightened against external surface 314 i) by hand, ii) by application of one or more tools, or iii) by a combination thereof. It will be appreciated that electrical conduit connector 100 may be disconnected from outlet box 300 by reversing the exemplary process described above. Once disconnected, electrical conduit connector 100 can be reused.

Referring to FIG. 7, enclosure engagement teeth 158 impinge upon external surface 314 to strengthen the engagement between lock nut 104 and sidewall $302_1$. As described above, first and second retention tabs 112 and 114 may have first and second circumferential extents 146 and 148 of up to 125 and 105 degrees, respectively (e.g. see FIG. 2). Such large circumferential extents 146 and 148 (see FIG. 2) may provide for a sturdy and reliable connection because surface-to-surface contact between i) enclosure engagements sides 116 and 118 of respective retention tabs 112 and 114 and ii) internal surface 312 of sidewall $302_1$ may surround a significant amount of knockout 308 (e.g. up to 230 degrees).

Figure 9:
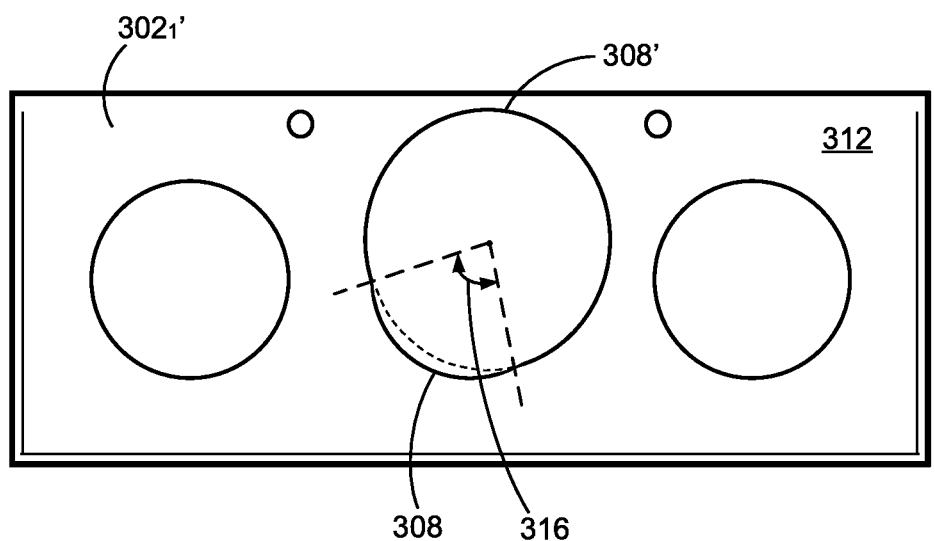
FIG. 9 is an elevation view of an outlet box having partially overlaid knockouts.

Turning to FIG. 9, illustrated therein is a sidewall $302_1'$. Sidewall $302_1'$ is similar to sidewall $302_1$ of outlet box 300 except that it includes partially overlapped knockouts 308 and 308'. As described above, in some situations, an electrician may elect to cut their own knockout, e.g. knockout 308'. This may be the case when the conduit connector(s) on hand is not the appropriate size for the prefabricated knockout 308. In other words, the electrician may need to make a knockout that corresponds to the size of the "on hand" conduit connector in order to ensure a rigid and reliable connection to outlet box 300 (a similar situation may apply to other types of electrical enclosures).

As shown, partially overlapped knockouts 308 and 308' create an unusual shape that may present connection issues. Since first and second retention tabs 112 and 114 have such large circumferential extents 146 and 148 (up to 105 and 125 degrees, respectively (see FIG. 2)), these connection issues may be averted with use of electrical conduit connector 100. For example, first circumferential extent 146 and second circumferential extent 148 may each be larger than a circumferential extent 316 of the portion of knockout 308 that extends from knockout 308'. As shown, circumferential extent 316 is taken from midpoint of knockout 308'. Accordingly, regardless of orientation, there remains at least some surface-to-surface contact between i) enclosure engagements sides 116 and 118 of respective retention tabs 112 and 114 and ii) internal surface 312 of sidewall $302_1$. Those skilled in the art will appreciate that if both first circumferential extent 146 and second circumferential extent 148 of respective first and second retention tabs 112 and 114 are not larger than circumferential extent 316, retention tabs 112 and 114 may inadvertently dislodge from (i.e. pop out of) overlapped knockouts 308 and 308'. Accordingly, in cases where two knockouts overlap, e.g. as shown in FIG. 9, electrical conduit connector 100 may still be used to provide a secure connection to the electrical enclosure while other multipart conduit connectors cannot.

Returning to FIG. 7, when enclosure engagement sides 116 and 118 of respective first and second retention tabs 112 and 114 are in contact with internal surface 312 of sidewall $302_1$, stabilizing ring 154 is seated within knockout 308. In this position, stabilizing ring 154 is able to stabilize the connection between electrical conduit connector 100 and outlet box 300, e.g. by preventing wobble and/or drift of connector body 102 in the radial direction relative to knockout 308.

As shown in FIGS. 3 to 8, electrical conduit connector 100 can be rigidly and reliably attached to outlet box 300 (and removed from outlet box 300) without requiring access to interior enclosure space 304. As described above, this may allow for quicker and safer installation, and may be particularly beneficial when outlet box 300 is located in a difficult to access area. Additionally, in cases where a panel has been attached to outlet box 300 to cover or block open end 306, the panel may not need to be removed prior to either installation or removal of electrical conduit connector 100.

FIGS. 7 and 8 show that only a small portion of connector body 102 protrudes into interior enclosure space 304. Thus, use of electrical conduit connector 300 may leave valuable interior enclosure space 304 for wires and other circuitry (space that is often in high demand). This may be particularly beneficial when multiple electrical conduit connectors 100 are to be secured to outlet box 300 because the space savings accumulate. Referring to FIG. 7, sidewall $302_1$ of outlet box 300 has a wall thickness 318. Each of first and second retention tabs 112 and 114 have a tab thickness 178. In the example shown, wall thickness 318 is about 150% tab thickness 178. In one or more alternative embodiments, the ratio of wall thickness 318 to tab thickness 178 may be lower, e.g. 1.25:1, or 1:1. This may provide a further reduction in use of interior enclosure space 304.

Since, as described above, lock nut 104 may be trapped on connector body 102, it may not be lost or misplaced. In such embodiments, an electrician cannot even inadvertently remove lock nut 104 from connector body 102. Nor can lock nut 104 fall off connector body 102 during shipping. Over time this may lead to a substantial cost savings.

With reference to FIG. 8, knockouts 308 adjacent to electrical conduit connector 100 may still be available for additional connections to outlet box 300. In the example shown, the diameter of external body threads 120 is smaller than the diameter of knockout 308 (much like that of current multipart conduit connectors that require the external threads to pass though the knockout). Accordingly, except for retention tabs 112 and 114 at electrical enclosure end $102_1$, connector body 102 may resemble the general configuration of connector bodies of current multipart conduit connectors. If the diameter of connector body 102 at external body threads 120 is increased beyond that of knockout 308, the ability of electrical conduit connector 100 to permit connections at adjacent knockouts may be compromised. Simply put, there may not be enough room.

With current multipart conduit connectors (e.g. those where the lock nut is removed and rethreaded with the connector body inside the electrical enclosure) problems may be encountered when it is being secured at a knockout that is formed close to a corner or edge of outlet box 300 (or other electrical enclosures). For these current conduit connectors, if there is insufficient space around the knockout to rethread the corresponding lock nut, that conduit connector cannot be secured at that particular knockout. This problem may be adverted with electrical conduit connector 100. In the majority of situations, first and second radial extents 128 and 130 of respective first and second retention tabs 112 and 114 are small enough to allow electrical conduit connector 100 to be coupled at a knockout that is located close to a corner of the electrical enclosure.

Once electrical conduit connector 100 is securely connected to outlet box 300, as shown in FIG. 8, a conduit may be attached to connector body 102. In other cases, an electrician may elect to attach the conduit to connector body 102 prior to connecting electrical conduit connector 100 to outlet box 300 (or other types of electrical enclosures).

Reference is now made to FIGS. 10-12 for illustration of an exemplary process of attaching a tubular conduit 400 to connector body 102. As described above, tubular conduit 400 is one of many types of conduit that can be attached to connector body 102. Tubular conduit 400 is used for illustrative purposes. As used is this disclosure, the term "conduit" is intended to mean any type of electrical conduit (rigid or flexible), any type of cable, or any other type of electrical conductor. These others types of conduits may be attached to connector body 102 in a similar fashion. For example, as will be described in more detail below, FIGS. 15-18 illustrate an exemplary process of attaching an armored cable 500 to an alternative electronic conduit connector 100'.

Referring to FIG. 10, tubular conduit 400 is inserted into internal passage 110 through conduit port 108 until tubular conduit 400 contacts conduit stop 164. In those embodiments without conduit stop 164, tubular conduit 400 may be inserted an adequate distance to ensure a firm connection (e.g. beyond internal bore 168).

Referring to FIG. 11, compression screw 166 is mated with threaded internal bore 168 and then rotated (e.g. in a clockwise direction 178) to advance compression screw 166 toward tubular conduit 400. Although FIG. 11 shows compression screw 166 fully separated from connector body 102, compression screw 166 may be sufficiently loosened to allow tubular conduit 400 to pass unobstructed through internal passage 110 without such separation.

Tubular conduit 400 may be rigidly attached to connector body 102 by continuing to rotate compression screw 166 until it firmly impinges upon tubular conduit 400, as shown in FIG. 12. This may involve rotating compression screw 166 until it can no longer be easily rotated. In this way, compression screw 166 frictionally secures tubular conduit 400 to connector body 102 within internal passage 110. Referring to FIG. 12, one or more wires and/or cables (not shown) may be passed through tubular conduit 400, connector body 102 and into the electrical enclosure (e.g. interior enclosure space 304 of outlet box 300) from electrical enclosure port 106. As described above, fillet 170 (see FIG. 1E) may smooth the transition for these wire and/or cables as they exit the electrical enclosure port 106, thereby reducing wire damage. In a similar way, fillet 170 may also smooth the transition for these wires and/or cables in the event they are removed from the electrical enclosure. This may increase their lifespan and/or permit reuse.

It will be appreciated that tubular conduit 400 may be disconnected from internal passage 110 by reversing the exemplary process described above. Once disconnected, tubular conduit 400 can be reused.

Figure 13:
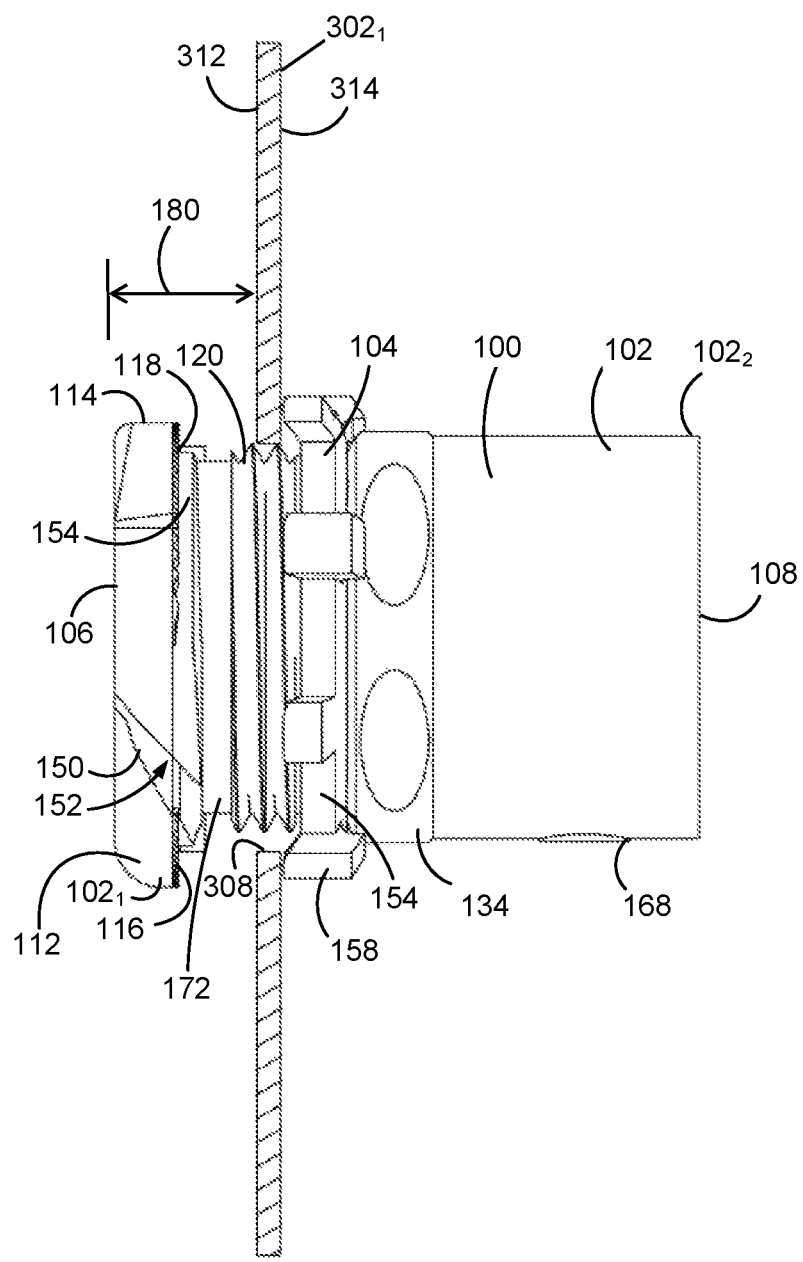
FIG. 13 is a cutaway view illustrating the electrical conduit connector of FIGS. 1A-E with a portion of its external body threads protruding into the outlet box of FIG. 3 through a knockout thereof.

Reference is now made to FIG. 13 to illustrate another aspect of electrical conduit connector 100. As shown, external body threads 120 have a diameter that is smaller than that of the knockout 308. Accordingly, when lock nut 104 is positioned away from electrical enclosure end $102_1$, connector body 102 is permitted to translate into interior enclosure space 304 of outlet box 302. Connector body 102 is permitted to translate into interior enclosure space 304 until enclosure engagement end $104_1$ of lock nut 104 makes contact with external surface 314 of outlet box 300. In this way, connector body 102 may protrude into interior enclosure space 304 a maximum distance 180 when the lock nut 104 is positioned as far away from electrical enclosure end $102_1$ as possible (e.g. at external surface 138). In the example shown, maximum distance 180 is about 1.5 cm. This may provide one or more advantages. For example, it may provide an electrician with valuable maneuver room when securing a conduit (e.g. inflexible tubular conduit 400) between two conduit connectors. In such cases, the electrician can position one or each of the electrical conduit connectors 100 as shown in FIG. 13 so that extra room may be provided for fitting inflexible tubular conduit 400 therebetween.

FIGS. 14A-14D illustrate an electrical conduit connector, referred to generally as 100', in accordance with another embodiment. Electrical conduit connector 100' shown in FIGS. 14A-14D is similar to electrical conduit connector 100 shown in FIGS. 1A-1E, except that electrical conduit connector 100' includes breakaway tabs $182_1$ and $182_2$ and a gate 184 movably coupled to screw 166.

Electrical conduit connector 100' may be used to couple an armored cable (also referred to as a BX cable) to a variety of electrical enclosures. As perhaps best shown in FIGS. 14C-14D, each of tabs $182_1$ and $182_2$ project radially into internal passage 110 from connector body 102. Tabs $182_1$ and $182_2$ may block passage of the armor (traditionally a metal jacket) while allowing the electrical wire within such armor to continue past tabs $182_1$ and $182_2$ and into the electrical enclosure. Accordingly, the distance that the armor of the armored cable can be inserted into internal passage 110 from conduit port 108 may be determined by the position of tabs $182_1$ and $182_2$. In this way, tabs $182_1$ and $182_2$ perform a function similar to conduit stop 164 of electrical conduit connector 100 (as shown in FIG. 1E). Preferably, tabs $182_1$ and $182_2$ are made from stainless steel; however, other suitable material may be used. Tabs $182_1$ and $182_2$ may be snapped into place within internal passage 110. Alternatively, tabs $182_1$ and $118_2$ may have a perforated seam at their respective juncture with connector body 102. As a result, tab $182_1$ and/or tab $182_2$ may break away from connector body 102 when a sufficiently high force, i.e. provided by an electrician, is applied to them.

Armored cables typically carry several thick gauge wires commonly used for plugs and/or switches. For example, in cases where the armored cable is carrying more than three wires, all the wires may not fit between tabs $182_1$ and $182_2$. In these cases, one or both of tabs $182_1$ and $182_2$ may be removed from internal passage 110 in order to allow additional wires to pass into the outlet box.

With current conduit connectors, the tabs are integral with the connector body (e.g. molded together) so that they do not easily come off. In cases where an electrician attempts to pass (i.e. squeeze) more wires though the tabs than there is room for, the wires may incur damage prior to the tabs breaking away. In addition, when wires are tightly squeezed between the tabs so that more wires may pass, the tabs can pinch and damage the wire. Accordingly, the ability to selectively remove tabs $182_1$ and $182_2$ may allow additional (or all) wires carried by the armored cable to pass into the outlet box and/or avoid damage caused by pinching.

Electrical conduit connector 100' includes a gate 184 that is movably coupled to screw 166 so that rotation of screw 166 concurrently translates gate 184 toward or away from internal passage 110 depending on the direction of rotation. Similar to electrical conduit connector 100, screw 166 is mated with a threaded bore 168 defined in connector body 102 between tabs $182_1$ and $182_2$ and conduit end $102_2$. As shown, connector body 102 includes an access slot 186 that allows gate 184 to translate unobstructed therethrough.

Gate 184 has a compression end $184_1$ and an opposed connector end $184_2$. Compression end $184_1$ can engage an armored cable located in internal passage 110, thereby holding the armored cable in place. In the example shown, compression end $184_1$ of gate 184 is curved so that it may better correspond to the shape of the armored cable. This may improve the retaining capability of compression end $184_1$. In cases where one or both tabs $182_1$ and $182_2$ are removed, screw 166 can be tightened so that compression end $184_1$ of gate 184 applies a sufficient force to the wires to hold them in place.

In the example shown, gate 184 includes a plug or stopper 188 located proximate to compression end $184_1$. Stopper 188 may prevent inadvertent disengagement (i.e. unthreading) between screw 166 and internal bore 168 (e.g. from over rotation of screw 166). Alternatively, stopper 188 may not be provided.

Figure 14A:
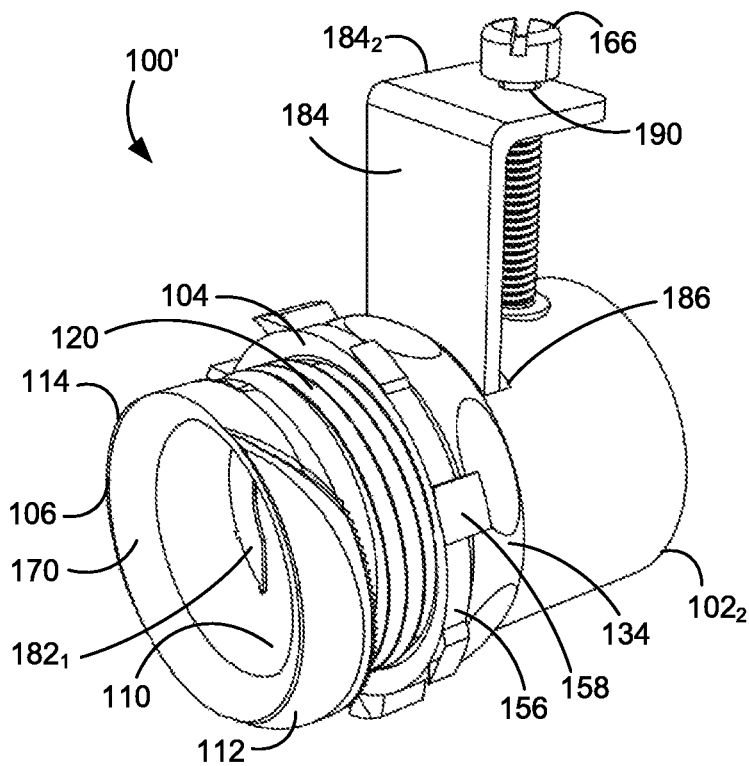
FIG. 14A is a perspective view of an electrical conduit connector, in accordance with another embodiment.
Figure 14B:
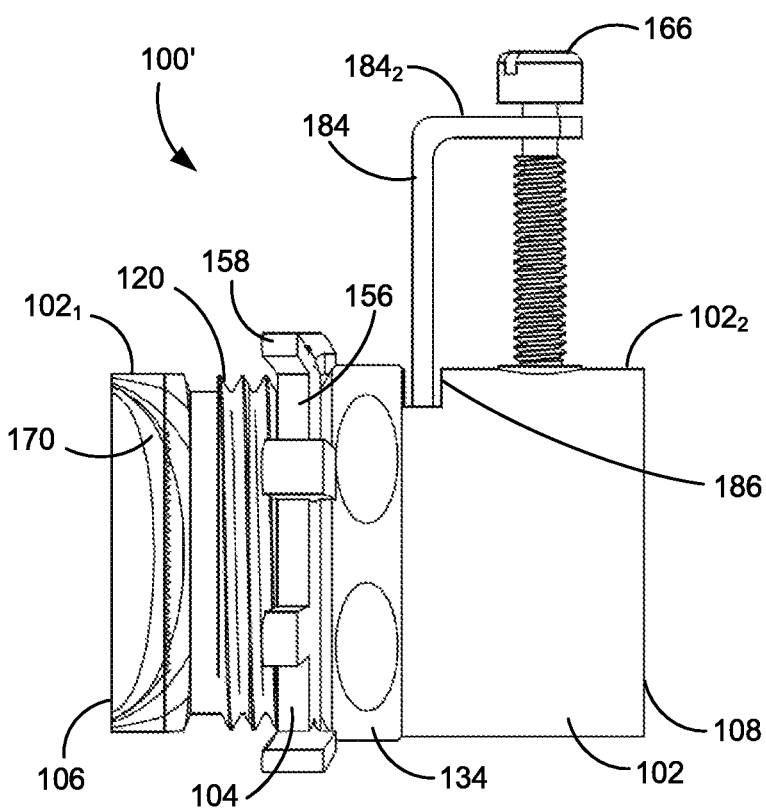
FIG. 14B is a side view of the electrical conduit connector of FIG. 14A.
Figure 14C:
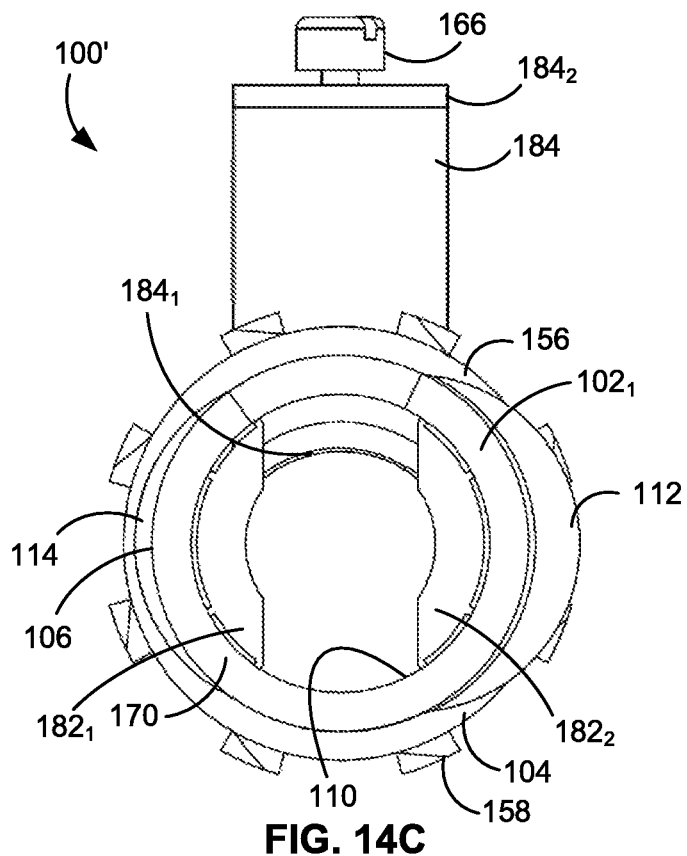
FIG. 14C is a top view of the electrical conduit connector of FIG. 14A.
Figure 14D:
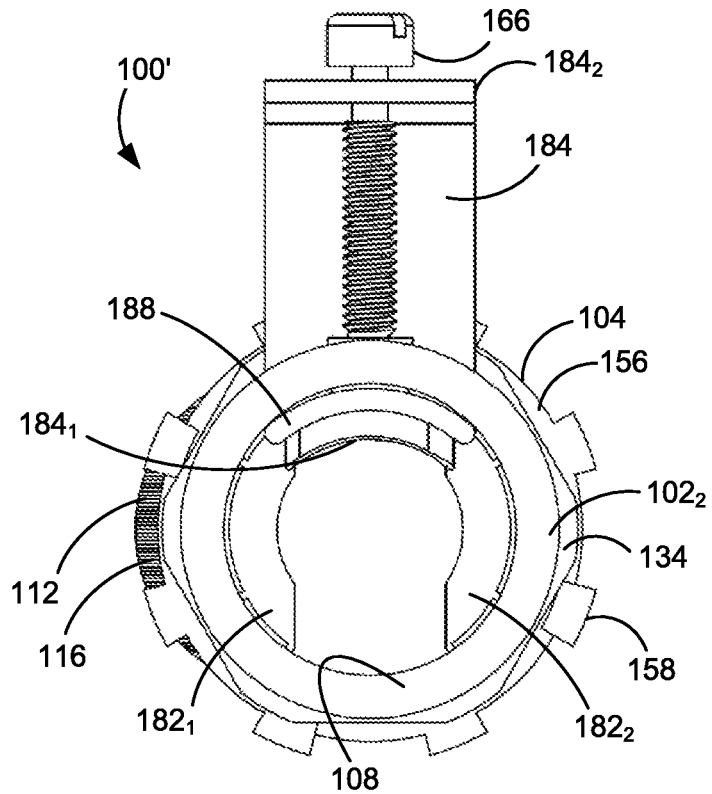
FIG. 14D is a bottom view of the electrical conduit connector of FIG. 14A.

Connector end $184_2$ of gate 184 has an aperture 190 defined therein. Screw 166 extends through aperture 190. With reference to FIGS. 14A-14B, aperture 190 has a diameter smaller than that of the head and threads of screw 166. Such an arrangement allows gate 184 to translate concurrently with rotation of screw 166. That is, as screw 166 translates so too does gate 184.

In the example shown, gate 184 is a generally L-shaped bracket. In alternative embodiments, gate 184 may have other suitable configurations that allow for similar functionality.

As will be described below, once the conduit has been positioned within the internal passage 110 (e.g. with a proximal end of the conduit abutting the conduit stop 164), compression screw 166 may be advanced (i.e. rotated) until it firmly engages the conduit, thereby holding the conduit in place within internal passage 110. In alternative embodiments, other suitable means of holding the conduit within internal passage 110 may be used, e.g. adhesive, clamps, and other suitable mechanical fasteners.

Reference is now made to FIGS. 15-18 for illustration of an exemplary process of attaching an armored cable 500 to electrical conduit connector 100'. In FIGS. 15-18, electrical conduit connector 100' has been previously secured to outlet box 300 of FIG. 3 (at middle knockout 308m of sidewall $302_1$). Electrical conduit connector 100' may be firmly secured to outlet box 300 in a similar fashion to that shown in FIGS. 4-8 for electrical conduit connector 100.

Figure 15:
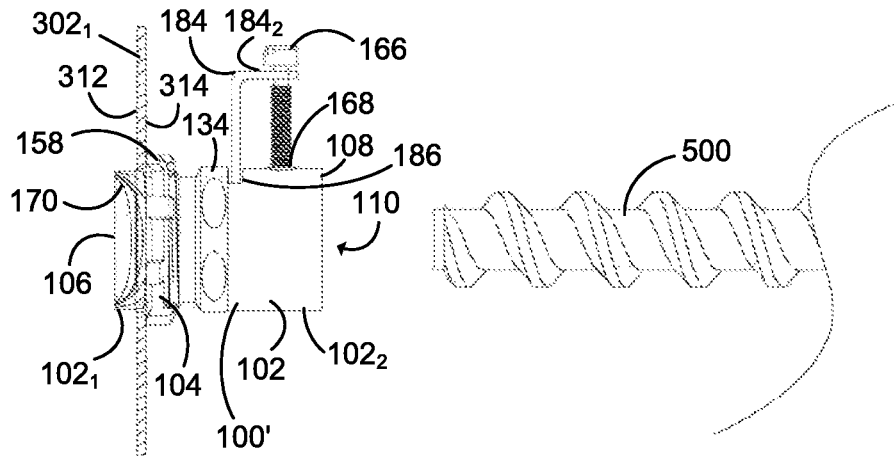
FIG. 15 is a cutaway view illustrating a first step in connecting an armored cable to the electrical conduit connector of FIGS. 14A-14D previously connected to the outlet box of FIG. 3.
Figure 16:
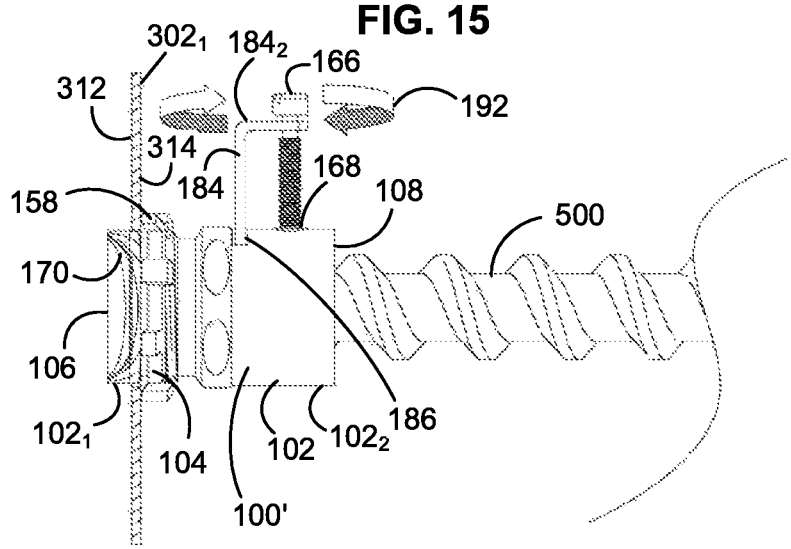
FIG. 16 is a cutaway view illustrating a further step in connecting the armored cable to the electrical conduit connector of FIGS. 14A-14D previously connected to the outlet box of FIG. 3.

Referring to FIG. 15, armored conduit 500 is oriented for insertion into internal passage 110 through conduit port 108. Referring to FIG. 16, armored conduit 500 is inserted into internal passage 110 until armored cable 500 contacts tabs $182_1$ and $182_2$. In those embodiments without tabs $182_1$ and $182_2$, armored cable 500 may be inserted an adequate distance to ensure a firm connection (e.g. beyond internal bore 168). As shown, screw 166 may be loosened sufficiently to allow armored cable 500 to pass unobstructed through internal passage 110 without separation of screw 166 from threaded bore 168.

Referring still to FIG. 16, screw 166 is rotated (e.g. in a counterclockwise direction 192) to advance compression end $184_1$ of gate 184 toward armored cable 500. As perhaps best shown in FIG. 18, armored cable 500 may be rigidly attached to connector body 102 by continuing to rotate screw 166 until compression end $184_1$ of gate 184 firmly engages armored cable 500. This may involve rotating screw 166 until it can no longer be easily rotated. In effect, gate 184 frictionally secures armored cable 500 to connector body 102 within internal passage 110.

Figure 17:
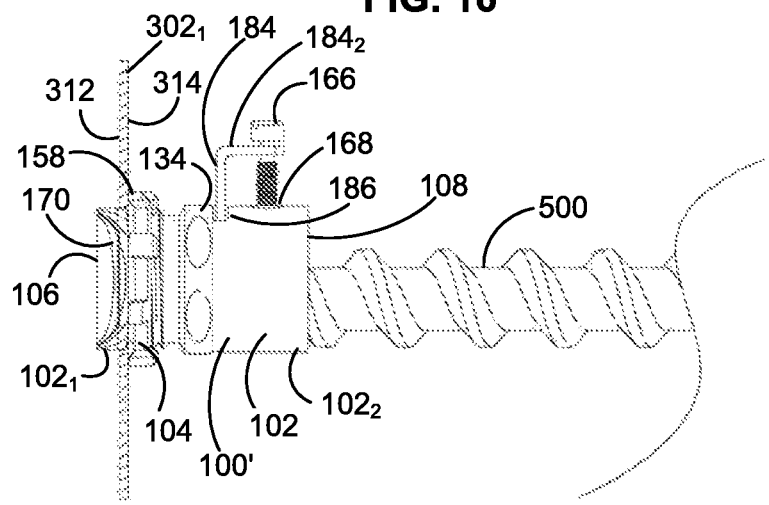
FIG. 17 is a cutaway view illustrating yet a further step in connecting the armored conduit to the electrical conduit connector of FIGS. 14A-14D previously connected to the outlet box of FIG. 3.
Figure 18:
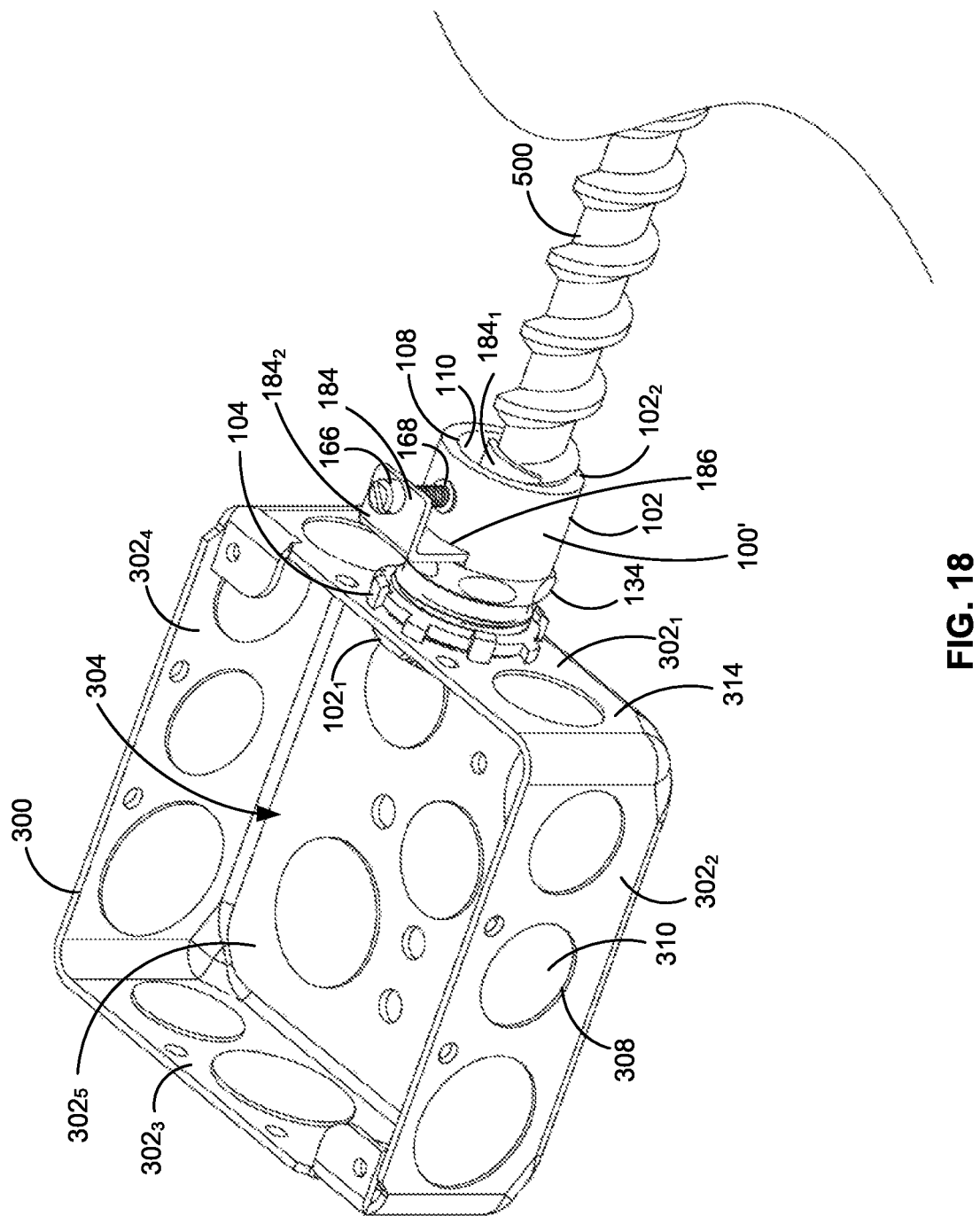
FIG. 18 is a perspective view illustrating the armored cable coupled to the outlet box of FIG. 3 by the electrical conduit connector of FIGS. 14A-14D.

Referring to FIGS. 17 and 18, one or more wires may extend from armored cable 500 into the electrical enclosure (e.g. interior enclosure space 304 of outlet box 300). As described above, fillet 170 (see FIG. 14A) may smooth the transition for these wires as they exit the electrical enclosure port 106, thereby reducing wire damage. In a similar way, fillet 170 may also smooth the transition for these wires in the event they are removed from the electrical enclosure.

It will be appreciated that armored cable 500 may be disconnected from internal passage 110 by reversing the exemplary process described above. Once disconnected, armored cable 500 can be reused.

While the above description describes features of example embodiments, it will be appreciated that some features and/or functions of the described embodiments are susceptible to modification without departing from the spirit and principles of operation of the described embodiments. For example, the various characteristics, which are described by means of the represented embodiments or examples, may be selectively combined with each other. Accordingly, what has been described above is intended to be illustrative of the claimed concept and non-limiting. It will be understood by persons skilled in the art that other variants and modifications may be made without departing from the scope of the claimed subject matter as defined in the claims appended hereto. The scope of the claims should not be limited by the preferred embodiments and examples, but should be given the broadest interpretation consistent with the description as a whole.

The invention claimed is:

1. An electrical conduit connector for coupling a conduit to an electrical enclosure, the electrical conduit connector comprising:
    a connector body extending longitudinally between a proximal electrical enclosure end and a distal conduit end, the connector body having an electrical enclosure port at the electrical enclosure end, a conduit port at the conduit end, and an internal passage extending between the electrical enclosure port and the conduit port, the electrical enclosure end having radially opposed first and second retention tabs, each of the first and second retention tabs extending radially outwardly, each of the first and second retention tabs having a distal facing enclosure engagement side, the connector body having external body threads located distally of the first and second retention tabs, each of the first and second retention tabs extending radially outward of a longitudinal projection of the external body threads;
    a lock nut mated with the external body threads, the lock nut having an enclosure engagement end opposed to the enclosure engagement sides of the first and second retention tabs, the lock nut being rotatable on the external body threads to advance the enclosure engagement end toward the first and second retention tabs.

2. The electrical conduit connector of claim 1, wherein the lock nut is trapped on the connector body.

3. The electrical conduit connector of claim 2, wherein the internal passage defines a longitudinal centre line, the first retention tab has a first tab radial extent from the centre line, the second retention tab has a second tab radial extent from the centre line, the external body threads have a thread radial extent from the centre line, each of the first and second tab radial extents being greater than the thread radial extent.

4. The electrical conduit connector of claim 3, wherein the first and second retention tabs obstruct removal of the lock nut from the electrical enclosure end.

5. The electrical conduit connector of claim 4, wherein contact between i) the enclosure engagement sides of the first and second retention tabs and ii) the enclosure engagement end of the lock nut obstructs advancement of the lock nut toward the electrical enclosure end of the connector body.

6. The electrical conduit connector of claim 3, wherein the connector body has a shoulder located distally of the external body threads, the shoulder having a shoulder radial extent from the longitudinal centre line, the shoulder radial extent being greater than the thread radial extent.

7. The electrical conduit connector of claim 6, wherein the connector body has an external surface located between the external body threads and the shoulder, the external surface having a longitudinal depth equal to or greater than that of the lock nut so that the lock nut can be formed around the external surface.

8. The electrical conduit connector of claim 6, wherein the shoulder obstructs removal of the lock nut from the conduit end.

9. The electrical conduit connector of claim 8, wherein the lock nut has a shoulder engagement end opposed to the enclosure engagement end, the shoulder has a proximal facing lock nut engagement side opposed to the shoulder engagement end of the lock nut, and contact between i) the lock nut engagement side of the shoulder and ii) the shoulder engagement end of the lock nut obstructs advancement of the lock nut toward the conduit end of the connector body.

10. The electrical conduit connector of claim 3, wherein the first tab radial extent is greater than the second tab radial extent.

11. The electrical conduit connector of claim 1, wherein the first retention tab has a first circumferential extent between 90 and 125 degrees.

12. The electrical conduit connector of claim 11, wherein the electrical enclosure end of the connector body has an arcuate groove that extends from one side of the first circumferential extent at the electrical enclosure end, distally around the first retention tab, to the other side of the first circumferential extent at the electrical enclosure end, the arcuate groove defining a knockout insertion band.

13. The electrical conduit connector of claim 1, wherein the second retention tab has a second circumferential extent between 90 and 105 degrees.

14. The electrical conduit connector of claim 1, wherein the first and second retention tabs have a collective circumferential extent between 180 and 230 degrees.

15. The electrical conduit connector of claim 1, wherein the electrical enclosure end of the connector body has a stabilizing ring located immediately distal of the first and second retention tabs, the stabilizing ring having a knockout diameter.

16. An electrical conduit connector for coupling a conduit to an electrical enclosure, the electrical conduit connector comprising:
    a connector body extending longitudinally between a proximal electrical enclosure end and a distal conduit end, the connector body having an electrical enclosure port at the electrical enclosure end, a conduit port at the conduit end, and an internal passage extending between the electrical enclosure port and the conduit port, the electrical enclosure end having radially opposed first and second retention tabs, each of the first and second retention tabs extending radially outwardly, each of the first and second retention tabs having a distal facing enclosure engagement side, the first retention tab having a first circumferential extent between 90 and 125 degrees, the second retention tab having a second circumferential extent between 90 and 105 degrees, the connector body having external body threads located distally of the first and second retention tabs;

a lock nut mated with the external body threads, the lock nut having an enclosure engagement end opposed to the enclosure engagement sides of the first and second retention tabs, the lock nut being rotatable on the external body threads to advance the enclosure engagement end toward the first and second retention tabs.

17. The electrical conduit connector of claim 16, wherein each of the first and second retention tabs extend radially outward of a longitudinal projection of the external body threads.

18. The electrical conduit connector of claim 17, wherein the lock nut is trapped on the connector body.

19. The electrical conduit connector of claim 18, wherein the internal passage defines a longitudinal centre line, the first retention tab has a first tab radial extent from the centre line, the second retention tab has a second tab radial extent from the centre line, the external body threads have a thread radial extent from the centre line, each of the first and second tab radial extents being greater than the thread radial extent.

20. The electrical conduit connector of claim 16, wherein the electrical enclosure end of the connector body has a stabilizing ring located immediately distal of the first and second retention tabs, the stabilizing ring having a knockout diameter.

* * * * *